United States Patent
Lipscomb

(10) Patent No.: US 10,882,238 B2
(45) Date of Patent: Jan. 5, 2021

(54) METHOD FOR MAKING QUENCHED GRANULAR ABSORBENT

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 1040 days.

(21) Appl. No.: 15/114,069

(22) PCT Filed: Jan. 26, 2015

(86) PCT No.: PCT/US2015/012969
§ 371 (c)(1),
(2) Date: Jul. 25, 2016

(87) PCT Pub. No.: WO2015/113006
PCT Pub. Date: Jul. 30, 2015

(65) Prior Publication Data
US 2016/0346981 A1   Dec. 1, 2016

Related U.S. Application Data

(60) Provisional application No. 61/931,609, filed on Jan. 25, 2014, provisional application No. 61/952,133, filed on Mar. 12, 2014.

(51) Int. Cl.
| | |
|---|---|
| B29C 48/04 | (2019.01) |
| B29B 9/06 | (2006.01) |
| B29B 9/12 | (2006.01) |
| B29B 9/16 | (2006.01) |
| A01K 1/015 | (2006.01) |
| B01J 20/30 | (2006.01) |
| B01J 20/28 | (2006.01) |
| B01J 20/32 | (2006.01) |
| B29L 31/00 | (2006.01) |

(52) U.S. Cl.
CPC ............ B29C 48/04 (2019.02); A01K 1/0152 (2013.01); A01K 1/0154 (2013.01); B01J 20/2803 (2013.01); B01J 20/3007 (2013.01); B01J 20/3236 (2013.01); B29B 9/06 (2013.01); B29B 9/12 (2013.01); B29B 9/16 (2013.01); B29L 2031/00 (2013.01)

(58) Field of Classification Search
CPC .... B29C 48/04; A01K 1/0152; A01K 1/0154; B01J 20/2803; B01J 20/3007; B01J 20/3236; B29B 9/06; B29B 9/12; B29B 9/16
USPC ....................................................... 502/404
See application file for complete search history.

(56) References Cited

U.S. PATENT DOCUMENTS

| | | |
|---|---|---|
| 3,316,590 A | 5/1967 | Rettig |
| 3,672,945 A | 6/1972 | Taylor |
| 4,822,546 A | 4/1989 | Lohkamp |
| 4,883,021 A | 11/1989 | Ducharme et al. |
| 4,954,352 A | 9/1990 | Luker |
| 5,098,635 A | 3/1992 | Widmer |
| 5,452,684 A | 9/1995 | Elazier-Davis et al. |
| 5,638,770 A | 6/1997 | Peleties |
| 5,664,523 A | 9/1997 | Ochi et al. |
| 5,735,232 A | 4/1998 | Lang et al. |
| 5,806,462 A | 9/1998 | Parr |
| 5,938,994 A | 8/1999 | English et al. |
| 5,942,170 A | 8/1999 | Peitz |
| 6,220,206 B1 | 4/2001 | Sotillo et al. |
| 6,720,406 B1 | 4/2004 | Eisner et al. |
| 2003/0065296 A1 | 4/2003 | Kaiser et al. |
| 2004/0112298 A1 | 6/2004 | Buttersnack et al. |
| 2004/0244710 A1 | 12/2004 | Tsengas et al. |
| 2005/0005869 A1 | 1/2005 | Fritter et al. |
| 2005/0005870 A1 | 1/2005 | Fritter et al. |
| 2007/0017453 A1 | 1/2007 | Fritter et al. |

(Continued)

FOREIGN PATENT DOCUMENTS

| | | |
|---|---|---|
| DE | 4424946 | 1/1996 |
| FR | 2794993 | 12/2000 |

(Continued)

OTHER PUBLICATIONS

Stryapkov et al. "Ekstruzionnaya obrabotka kak faktor polucheniya ekologicheski bezopasnykh" produktov iz zerna i ego proizvodnykh. Vestnik OGU 2'2004, pp. 171-174.

(Continued)

*Primary Examiner* — Edward M Johnson
(74) *Attorney, Agent, or Firm* — Boyle Fredrickson S.C.

(57) ABSTRACT

A method of extruding self-clumping granular absorbent having cold water soluble amylopectin starch binder formed from starch-containing admixture sufficient for extruded sorbent pellets to produce flowable binder flowing between pellets clumping them together producing clumps of pellets that become hard when substantially dry that have a crush strength of at least 25 PSI and clump retention of at least 80% and preferably at least 90%. As a result, dried pellet clumps are easy to pick up leaving behind unspent pellets for continued sorbent use. A pellet quenching method rapidly cools and dries pellets before leaving the extruder preventing loss of cold water soluble starch and binder, preventing pellet shrinkage, and preventing pellet densification. An air conveyor transporting quenched pellets removed from the extruder further cools and dries the pellets producing pellets ready for sorbent use.

34 Claims, 6 Drawing Sheets

(56) References Cited

U.S. PATENT DOCUMENTS

| | | |
|---|---|---|
| 2007/0029692 A1 | 2/2007 | Pallmann |
| 2007/0175403 A1 | 8/2007 | Wang et al. |
| 2007/0289543 A1 | 12/2007 | Petska et al. |
| 2008/0223302 A1 | 9/2008 | Wang et al. |
| 2009/0000562 A1 | 1/2009 | Jenkins et al. |
| 2009/0017166 A1 | 1/2009 | Wijnoogst et al. |
| 2010/0269758 A1 | 10/2010 | Fuchshuber |
| 2011/0185977 A1 | 8/2011 | Dixon et al. |
| 2011/0253055 A1 | 10/2011 | Tang et al. |
| 2011/0287123 A1 | 11/2011 | Feichtinger et al. |
| 2012/0152115 A1 | 6/2012 | Gerds et al. |
| 2013/0213313 A1 | 8/2013 | Wang et al. |
| 2013/0213314 A1 | 8/2013 | Wang et al. |

FOREIGN PATENT DOCUMENTS

| | | |
|---|---|---|
| JP | H03290126 | 12/1991 |
| JP | 2000051691 | 2/2000 |
| JP | 2002240032 | 8/2002 |
| JP | 2007039954 | 2/2007 |
| JP | 2009195765 | 9/2009 |
| RU | 2153251 | 7/2000 |
| RU | 2273129 | 4/2006 |
| WO | 1984003513 | 9/1984 |
| WO | 2011094022 | 8/2011 |
| WO | 2011134074 | 11/2011 |
| WO | 2014043284 | 3/2014 |

OTHER PUBLICATIONS

Written Opinion dated Mar. 24, 2016 issued in PCT/US2015/062233.

ISR and Written Opinion dated Dec. 30, 2013 issued in PCT/US2013/059284.

ISR and Written Opinion dated Dec. 19, 2013 issued in PCT/US2013/059325.

ISR and Written Opinion dated Jun. 4, 2015 issued in PCT/US2015/012869.

International Preliminary Report on Patentability dated Apr. 22, 2016 issued in PCT/US2015/012969.

ISR and Written Opinion dated May 4, 2015 issued in PCT/US2015/012969.

Extended EP Search Report dated Apr. 22, 2016 issued in EP App. No. 13837242.0.

Extended EP Search Report dated Jun. 3, 2016 issued in EP App. No. 13837783.3.

ISR and Written Opinion dated Jun. 18, 2015 issued in PCT/US2015/020167.

ISR and Written Opinion dated Aug. 6, 2015 issued in PCT/US2015/020310.

Patent Examination Report No. 1 dated May 4, 2016 issued in AU 2013315516.

ISR & Written Opinion dated May 24, 2016 in PCT/US2016/015000.

METHOD FOR MAKING QUENCHED GRANULAR ABSORBENT

FIELD

The present invention is directed to granular absorbent and more particularly to a clumping granular absorbent that adsorbs and absorbs water and water-insoluble liquids that is well suited for use as animal litter and oil absorbent, a system used to make granular absorbent, and a method of making such granular absorbent including quenching by cooling and drying upon and following extrusion.

BACKGROUND

While attempts have been made in the past to produce a lighter, more natural, and even biodegradable cat litter, improvements nonetheless remain desirable. Conventional clay-based and gel-based litters are relatively heavy, cost a considerable amount of money to ship, are not biodegradable, and are often a burden for purchasers to carry. While many so-called natural cat litters have been introduced into the marketplace, they can be nearly as heavy as conventional litter, typically absorb far less urine than conventional litter, can produce their own unpleasant odor, and many times do not clump well, if they even clump at all.

Attempts have also been made in the past to make granular absorbents, including cat litter, from starch-containing admixtures, including cereal grain admixture, but they are believed to date to have enjoyed little, if any, commercial success. Past attempts have produced extruded granular absorbents that absorb poorly, require grinding or shattering of the granular absorbent before use, and are challenging to pick up after use.

What is needed is a natural granular absorbent that overcomes one or more of the aforementioned drawbacks.

SUMMARY

The present invention is directed to a granular absorbent extrusion system and method of making granular absorbent in accordance with the present invention producing sorbent granules or pellets that absorb and adsorb liquids, including water, urine, liquid fecal matter, oil and other water insoluble/immiscible liquids which can form clumps of pellets when pellets are wetted with water that become substantially hard when dried enabling the clumps of spent or used granular absorbent to be easily picked up and disposed of after use. A preferred method of making granular absorbent extrudes absorbent pellets from a starch-containing mixture using an extruder, e.g., extrusion cooker, having sufficient water-soluble binder in each pellet to form a flowable adhesive when the pellet is wetted that flows from the pellet onto and around adjacent pellets adhering them together forming clumps.

The mixture or admixture containing sufficient starch that sorbent granules extruded therefrom each contain water-soluble binder formed by physically converting or modifying starches in the mixture in an amount sufficient to form clumps of pellets when wetted that have a clump crush strength of at least 25 pounds per square inch and a clump retention rate of at least 80% when substantially dry. One preferred starch-containing mixture is formed of one or more cereal grains, which can be comminuted or ground, fiber, and other constituents or additives, containing sufficient starch for a enough water-soluble binder to be formed in each pellet by physically converting or modifying starches in the mixture during extrusion to produce self-clumping sorbent pellets that provide their own clumping binder when wetted. Such a preferred starch-containing mixture contains enough starch that cold water soluble starch binder, preferably cold water soluble amylopectin binder, and more preferably an amorphous cold water soluble amylopectin binder, is formed in each pellet by starch molecular weight reducing starch conversion or modification during extrusion in an amount sufficient to flow binder from each wetted pellet to clump wetted pellets together.

In a preferred method of making self-clumping granular absorbent, pellets extruded from such a starch-containing mixture form at least 10% water soluble starches by uncoated pellet weight in each pellet including a sufficient amount of water soluble starch binder for the pellets to self-clump. In one preferred method and granular absorbent, starches in the mixture are physically modified or converted, e.g. causing starch molecular weight reduction, during extrusion into water-soluble starches in an amount of at least 15% cold water-soluble starches, including sufficient cold water soluble starch binder, to produce self-clumping sorbent pellets that form clumps each having a clump crush strength of at least 25 pounds per square inch and a clump retention rate of at least 80% when substantially dry. In another preferred method and granular absorbent, sorbent pellets are extruded having at least 15% cold water soluble starch binder, preferably cold water soluble amylopectin binder, in each pellet formed by converting starches in the mixture during extrusion producing self-clumping sorbent pellets that form clumps when wetted having a clump crush strength of at least 25 pounds per square inch and a clump retention rate of at least 90%, preferably at least 95%, when substantially dry. In carrying out preferred methods of making granular absorbent in accordance with the present invention, sorbent pellets are extruded having a water-soluble starch binder contents, including cold water soluble amylopectin starch binder contents, ranging between 15% to as much as 55%, producing self-clumping granular sorbent pellets of the present invention having clump crush strengths ranging between 25 pounds per square inch and 65 pounds per square inch with clump retention rates ranging between 80% and 99%.

While extruded granular materials, including in granule or pellet form, have typically been dried after extrusion on a conveyor in a heated oven at temperatures well above ambient, typically above 250 degrees Fahrenheit, a method and granular absorbent extrusion system in accordance with the present invention quenches the sorbent pellets immediately upon extrusion and before being removed from the extruder producing improved sorbent pellets of granular absorbent. Where post-extrusion quenching is performed, the granular absorbent extrusion system includes a pellet quenching apparatus that quenches each pellet immediately upon extrusion, and preferably at least until the pellet leaves the extruder, rapidly cooling and preferably flash drying each pellet.

In oven drying granules or pellets of extruded granular material, the extruded granules or pellets are typically delivered from the extruder onto the oven conveyor with minimal or no cooling or drying occurring beforehand. It has been found that oven drying granular absorbent not only takes time and consumes expensive energy, it actually reduces the absorptivity of the granular absorbent. Where the extruded granular absorbent contains water-soluble starches, including water-soluble starch binders, it has been learned that oven drying reduces the amount of water solubles, including water-soluble binder, present in each sorbent pellet after oven drying. It has also been learned that sorbent pellets immediately upon extrusion are relatively hot and moist such that absorptivity and clumping ability is dramatically reduced even during the time the sorbent pellets are being transported to the drying oven. Not only is the water-soluble starch, including water-soluble starch binder, content of each extruded pellet significantly reduced, but the moisture causes each pellet to shrink significantly. Where maintaining a desired pellet density is important, this post-extrusion moisture induced shrinkage densifies each pellet undesirably increasing granular absorbent bulk density.

In a preferred quenching apparatus and quenching method, quenching gas, preferably air, is delivered to a quenching chamber surrounding a discharge end of the extruder directing quenching air onto sorbent pellets as they are being extruded out an extruder die and cut from the die by a rotary cutter of the extruder. Quenching air at a sufficient volumetric flow rate, low enough temperature below pellet extrusion temperature, and low enough moisture content, e.g., humidity, is delivered from an air mover to the quenching chamber producing turbulent flow within the quenching chamber that not only convectively cools the pellets thereby quenching them, but also carries the pellets in the quenching air gas flow to a pellet discharge where the quenched extruded pellets are then removed from the extruder.

During quenching, the pellets are cooled at least 15 degrees Celsius below the pellet extrusion temperature before the pellets leave the quenching chamber leaving the extruder. The turbulently flowing quenching air evaporatively dries each pellet rapidly removing, preferably by evaporation, moisture vaporized in each pellet during extrusion preventing excessive buildup in moisture on an outer surface of each pellet as well as in an outermost portion of each pellet. Rapid removal of vaporized moisture from each pellet advantageously prevents pellet shrinkage preferably by preventing water-soluble starches in the outer pellet surface from dissolving or solubilizing and collapsing each pellet shrinking the pellet. By preventing pellet shrinkage due to water-soluble starch solubilization, the amount of water soluble starches, including water-soluble starch binder, present in each pellet immediately after extrusion is advantageously preserved thereby maximizing pellet absorption and pellet clumping.

In addition, rapid cooling of each pellet by quenching each pellet immediately upon extrusion, and preferably during extrusion, produces sorbent pellets with a greater water soluble starch content that preferably also have a greater amount of water-soluble starch binder present in each pellet. This is because cooling each pellet during and immediately after extrusion by quenching advantageously prevents physically modified or converted starches, including amorphous starches, such as cold water-soluble amylopectin, preferably amorphous cold water soluble amylopectin binder, whose molecular weight was reduced during pellet extrusion, from changing phase or structure including by preventing amorphous starches formed during physical conversion or modification during extrusion from losing their amorphous state, e.g. preventing crystallization or retrogradation. Preferably, quenching freezes or locks amorphous water-soluble starches, including amorphous water soluble starch binders, preferably amorphous cold water-soluble amylopectin binder, crystallization or retrogradation of such amylopectin starches preferably is prevented or at least reduced by quenching.

Such rapid cooling of each pellet by quenching can accelerate retrogradation of amylose starches in each pellet, including physically converted or modified amylose starches whose molecular weight was reduced during pellet extrusion. Where quenching rapidly retrogrades amylose starches in each pellet, retrogradation of amylose starches preferably strengthens or stiffens each pellet including by forming a starch matrix, preferably including more formed of amylose, that is stiffer and better maintains liquid adsorbing voids and pores formed in each pellet improving pellet adsorption and/or absorption.

As a result of pellet quenching, the outer surface pores, outer surface irregularities, outer surface depressions, cracks, and other three dimensionally contoured outer surface features of each extruded pellet formed during extrusion is better preserved, preferably substantially preserved, thereby producing quenched extruded pellets having increased surface roughness with at least a plurality of surface pores that more readily adsorb and/or absorb liquids, including water, during sorbent use. As a result of pellet quenching, internal absorptivity improving voids or pockets produced during expansion or puffing during extrusion are advantageously better preserved, more numerous and larger further increasing pellet adsorption and absorption during granular sorbent use.

In a preferred quenching apparatus embodiment, a quenching air delivery conduit has an outlet in gas flow communication with the quenching chamber directing turbulently flowing quenching air across the die carrying the extruded pellets in the quenching airflow to a discharge where the pellets are then removed from the extruder. In one preferred embodiment, a knife cage enclosing the die and cutter at the discharge end of the extruder forms a plenum that is positively pressurized by the quenching air that is at least part of the quenching chamber. The quenching chamber can and preferably also includes a pellet collector below the knife cage with extruded pellets being quenched and carried by the turbulent quenching airflow from the knife cage to the pellet collector without contacting the knife cage. Both the knife cage and the pellet collector can be of substantially airtight construction to facilitate quenching and pellet transport during quenching from the extruder die into the pellet collector and out the discharge.

A method of extruding granular absorbent with a granular absorbent system equipped with a pellet quenching apparatus of the present invention advantageously produces quenched extruded sorbent pellets having improved absorptivity and clumping. Quenched extruded pellets of granular sorbent of the present invention are self-clumping by dissolving and flowing water soluble binder from wetted pellets in between adjacent pellets hearing and clumping them together. Quenched extruded pellets of granular sorbent of the present invention advantageously also form clumps that become substantially hard when dry having excellent crushed clump strength and excellent clump retention.

A granular absorbent system constructed in accordance with the present invention can also include a pneumatic conveyor with a pellet transporting conduit in gas flow communication with the discharge of the pellet collector or quenching chamber that further cools and dries the pellets as they are transported to a location remote from the extruder.

Cooling and drying advantageously is performed using quenching air drawn from air at ambient temperature such that cold quenching of the extruded pellets are performed producing improved sorbent pellets of granular absorbent of the present invention with increased absorptivity, clumping ability, and which are shelf stable at room temperatures for months, if not years, producing granular absorbent that is stable, natural, e.g. organic, biodegradable, and economical that is particularly well suited for animal litter, oil absorbent and other liquid absorbent applications.

These and other objects, features and advantages of this invention will become apparent from the following detailed description of the invention and accompanying drawings.

DRAWING DESCRIPTION

One or more preferred exemplary embodiments of the invention are illustrated in the accompanying drawings in which like reference numerals represent like parts throughout and in which.

Figure 1:
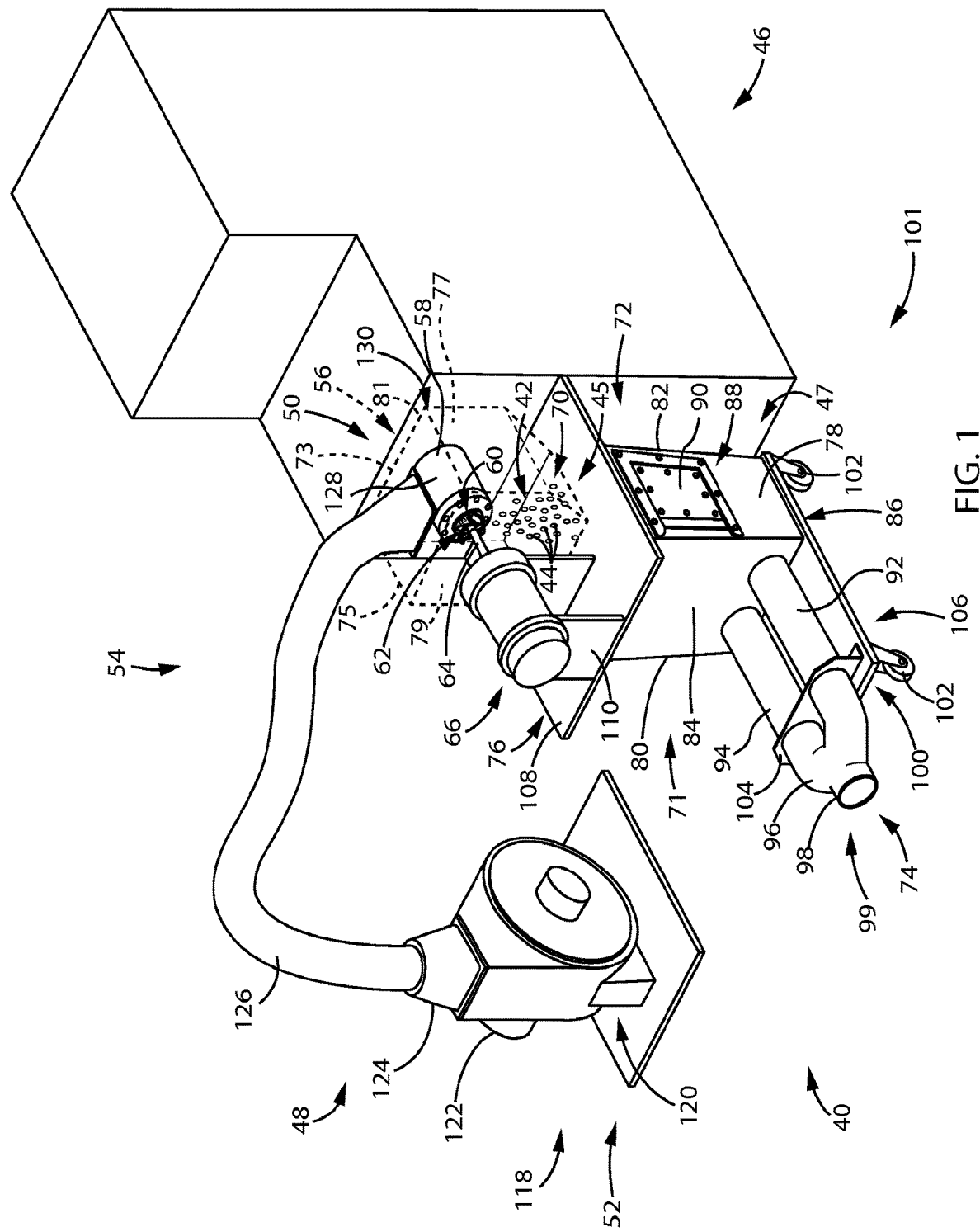
FIG. 1 illustrates a top perspective view of a granular absorbent extrusion system equipped with a pellet quenching apparatus of the present invention used in making extruded granular sorbent.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-6 illustrate a preferred embodiment of a granular absorbent extrusion system 40 for extruding a starch-containing admixture forming extruded granules or pellets 42 of granular sorbent 44 that are not only water sorbent and particularly well suited for use as animal litter but which in at least one embodiment preferably also is oil sorbent and thereby also suitable for use as oil absorbent. The granular sorbent 44 is formed from starch-containing admixture having sufficient starch so that when starch in the admixture is gelatinized, melted, and/or degraded and extruded by an extruder 46 at a desirably high enough extruder pressure and extruder temperature, sorbent pellets 42 are formed each having enough starch-based liquid soluble binder that sufficiently wetted pellets 42 adhere or clump to one another during use producing self-clumping granular sorbent 44. In at least one preferred method and embodiment, the extruded granular sorbent 42 is organic granular sorbent 42 and the pellets 42 of such extruded organic granular sorbent 42 are biodegradable. A preferred starch-containing admixture includes one or more cereal grains and can be formed substantially completely of the one or more cereal grains extruding sorbent pellets 42 of the invention that are organic, biodegradable, and which can also be toilet flushable under certain circumstances.

The granular absorbent extrusion system 40 has an extruder 46 that preferably is a single screw extruder but which can also be a twin screw extruder if desired. A preferred method of making granular absorbent 44 in accordance with the present invention utilizes a starch-containing admixture having sufficient starch and a low enough moisture content extruded from the extruder 46 at a high enough extruder temperature and pressure to form extruded absorbent pellets 42 each having at least 10% water-soluble starches by uncoated pellet weight including sufficient starch-based water-soluble binder, preferably cold water soluble starch binder, for pellets 42 to adhere to one another when wetted including forming clumps of pellets 42 that become substantially hard when dry.

The granular absorbent extrusion system 40 can also be equipped with a pellet quenching apparatus 48 that quenches each pellet 42 immediately upon extrusion rapidly cooling and preferably also drying at least a portion of an outer surface of each pellet 42 before being transported from the extruder 46 to a location remote from the extruder 46. Where the granular absorbent extrusion system 40 is equipped with a pellet quenching apparatus 48, quenching of the extruded pellets 42 before the pellets 42 are removed from the extruder 46 reduces the temperature of the pellets 42 by at least about 25 degrees Celsius or by at least about 45 degrees Fahrenheit to a temperature no greater than about 83 degrees Celsius or no greater than 180 degrees Fahrenheit. Quenching preferably also dries each pellet 42 by rapidly removing vaporized moisture escaping from the pellet 42 that would ordinarily dissolve or solubilize water soluble starches, including cold water soluble starches, preventing pellet shrinkage while optimizing water absorption and clumping.

Where a pneumatic conveyor 99 is used to remove the quenched extruded pellets 42 from the extruder 46 and transport the pellets 42 to the remote location, further pellet cooling and drying is performed during pneumatic conveyor transport cools the pellets 42 to a temperature no higher than about 45 degrees Celsius or no higher than about 113 degrees Fahrenheit. Where a pneumatic conveyor 99 is used to remove the quenched extruded pellets 42 from the extruder 46 and transport the pellets 42 to the remote location, further pellet cooling and drying is performed during pneumatic conveyor transport that cools the pellets 42 to a temperature no higher than about 43 degrees Celsius or no higher than about 110 degrees Fahrenheit and preferably also dries the pellets 42 to a moisture content no greater than about 13% by uncoated pellet weight.

Cooling and drying of granular sorbent 44 of the present invention is advantageously done during quenching and pneumatic conveyor transport without having to heat the pellets 42 after extrusion to dry them, which not only saves time and energy but also helps prevent loss of clumping water soluble starches resulting in pellets 42 that form substantially hard clumps during sorbent use that retain material in liquid absorbed and adsorbed in the clump after the clump dries.

Granular Sorbent and Method of Extruding Granular Sorbent

The extruder 46 has an elongate generally cylindrical barrel 58 carrying a circular or disk-shaped perforate extrusion die 60 from which at least a plurality of pairs, i.e., at least three, of pellets 42 are extruded per second during extruder operation. The pellets 42 are formed from "ropes" or strings of extrudate (not shown) exiting substantially simultaneously from a plurality of pairs of bores or openings 61 (FIG. 6) in the die 60 which are cut into pellets 42 by a rotary cutter 62 on a cutting shaft 64 rotated by an electric motor 66 during extruder operation. During extrusion, the "ropes" or strings of extrudate are squeezed out or flow from the die openings 61 in an axial direction generally parallel to an axis of rotation of the cutter shaft 64 toward the rotary cutter 62, which slices them into pellets 42.

The knife cage 56 is a protective housing that encloses a discharge end 68 of the extruder barrel, the die 60, cutter 62, and part of the cutter shaft 64. The knife cage 56 can be generally rectangular, e.g., square, having a top wall 73 and a plurality of pairs of sidewalls 75, 77, 79 and 81. The knife cage 56 overlies a bottom opening 70 through which pellets 42 in the knife cage 56 pass into a pellet-collecting hopper 71, e.g. pellet collector 72, which can form or be part of the extrudate discharge chamber 47. The knife cage 56 has a necked down funnel 83 at its bottom that helps direct or funnel pellets 42 into the opening 70 of the pellet collector 72. Pellets 42 received in the pellet collector 72 after passing through the knife cage 56 are conveyed therefrom via a pellet discharge 74 in fluid-flow communication with a bottom portion of the pellet collector 72.

Figure 2:
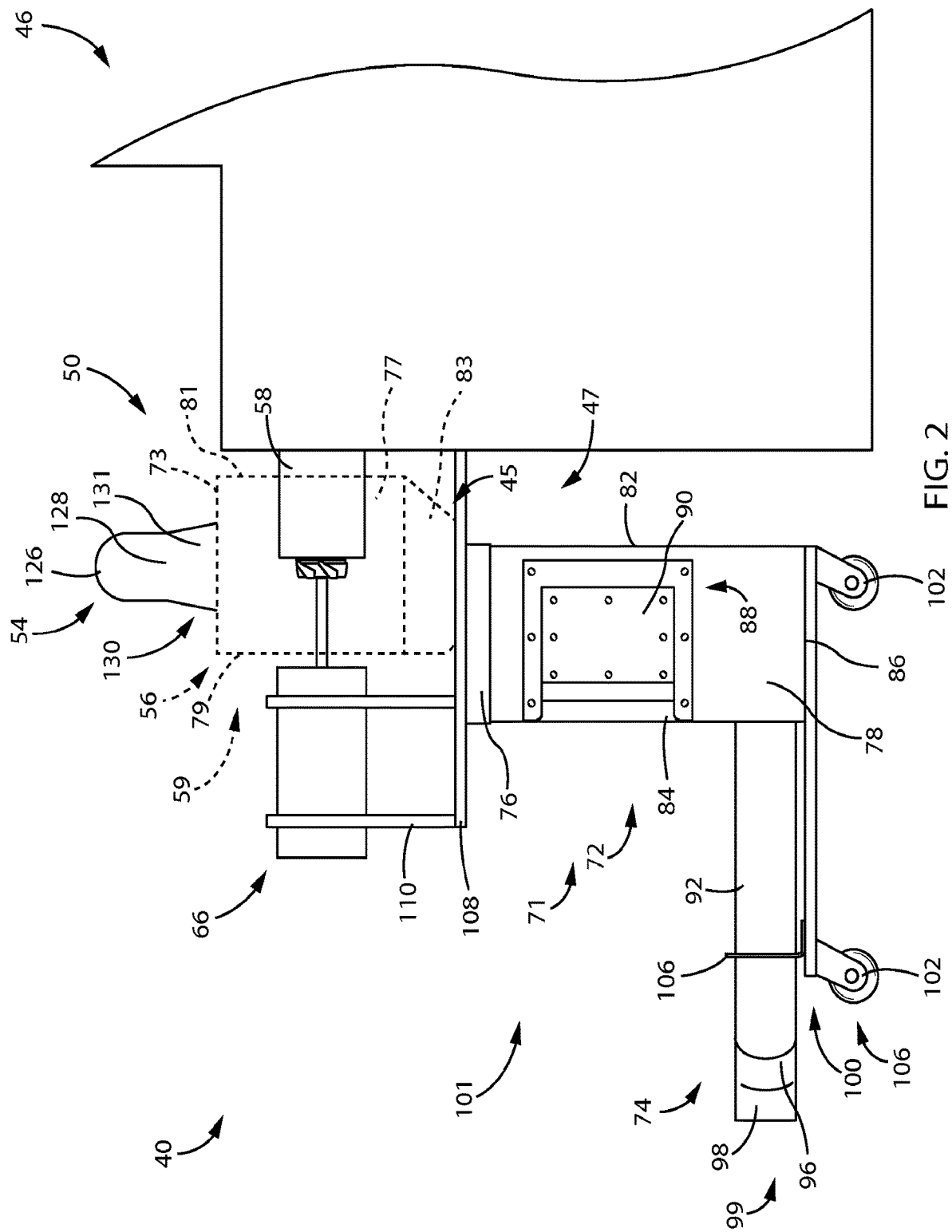
FIG. 2 is a fragmentary side elevation view an extruder or extrusion cooker illustrating an extrudate discharge chamber at a discharge end of the extruder formed of one or both of knife cage and pellet collector that forms part of the pellet quenching apparatus.

The pellet collector 72, e.g., hopper 71, can also be generally rectangular, e.g., square. As best shown in FIGS. 1 and 2, the collector 72 is formed of a top 76, plurality of pairs of sidewalls 78, 80, 82, 84, and a bottom 86 forming a pellet collecting hopper 71, e.g., pellet collector 72, which can be gravity fed by the knife cage 56 during extruder operation. While the pellet collector 72 can be and preferably is of generally gas-tight, i.e., airtight, construction, one or more of top, walls and bottom, 76, 78, 80, 82 and/or 84 can include one or more ports (not shown) through which ambient atmosphere outside the collector 72 and extruder 46 can enter during operation. One of the walls 78 of the pellet collector 72 can include an access door 88 which can be equipped with a sight glass 90 in the form of a transparent panel made of plastic, e.g. clear acrylic, glass, e.g., tempered glass, or another suitable see-through material. The sight glass 90 enables viewing inside the pellet collector 72 during operation and the access door 88 provides access inside the collector 72 when needed to clean, service or otherwise inspect inside the collector 72.

As is best shown in FIG. 1, the pellet discharge 74 includes at least one duct and preferably a plurality of elongate hopper pellet discharge ducts 92, 94 that each can independently and preferably both substantially simultaneously convey pellets 42 received in the pellet collector 72 away from the extruder 46. The ducts 92, 94 can be generally horizontal, spaced apart, and generally parallel to one another arranged in a side-by-side arrangement with each duct 92, 94 in fluid-flow communication with opposite sides of the collector 72 adjacent the hopper bottom 86 to better prevent pellet accumulation during extruder operation.

The ducts 92, 94 can converge using a wye 96 into an elongate common pellet discharge conduit 98, only a portion of which is shown in FIG. 1, used to transport pellets 42 from the pellet collector 72 to a location remote from the extruder 46 where the pellets 42 can be processed such as by cleaning, abrading, classifying, drying, treating and/or packaging the pellets 42. In a preferred embodiment, the ductwork of the discharge 74 is part of a pneumatic conveyor 99 to which a plurality of extruders 46 are connected to substantially simultaneously transport pellets 42 as they are extruded from a plurality of extruders 46 operating at the same time in the same plant or production facility.

During pneumatic conveyor operation, one or more blowers, fans, or other air moves are operated to move air through the ductwork of the pneumatic conveyor 99 transporting pellets 42 from the pellet collector 72 of each extruder 46 to at least one remote location. Air flowing through the ductwork preferably sucks pellets 42 from at or adjacent the bottom of the collector 72 into one or both ducts 92, 94, including substantially simultaneously, transporting the pellets 42 conduit 98 to the at least one remote location. Doing so preferably creates a pressure differential within the pellet collector 72, e.g. a vacuum, which facilitates sucking pellets 42 in the collector 72 into ducts 92, 94.

In a preferred method of making granular sorbent in accordance with the present invention by extrusion using extruder 46, a starch-containing admixture is formed of one or more cereal grains, such as corn and/or sorghum, producing a starch-containing admixture having at least 40% starch and preferably at least 50% starch by dry admixture weight and which possesses a moisture content no greater than 25% by dry admixture weight. One or more other cereal grains, including maize, wheat, rice, triticale, barley, millet, rye, quinoa and buckwheat, as well as combinations thereof, can be used. The admixture can include fiber, preferably insoluble fiber, e.g., cellulose or cellulosic fiber, in an amount preferably not more than 40% by dry admixture weight. Where the admixture includes fiber, a preferred fiber containing admixture contains between 5% and 30% fiber by dry admixture weight. In one preferred fiber-containing admixture, the admixture contains between 10% and 25% fiber and can contain between 5% and 15% fiber. Where the admixture contains fiber, preferred sources of fiber include alfalfa, oat fiber, wheat fiber, beet fiber, paper fiber, e.g., recycled paper, wood fiber, e.g., pine fiber, and other types or sources of cellulose containing or cellulosic fiber.

One preferred admixture is formed of substantially completely of comminuted or ground corn, e.g. cornmeal, corn grits, or corn starch, and the corn admixture can contain as much as 40% fiber by dry admixture weight. Corn used in the admixture can be de-germed if desired. Where the corn admixture contains fiber, the admixture preferably contains between 5% and 30% fiber and can contain between 10% and 25% fiber. The balance of the admixture can contain other additives including colorant, dye, fragrances, scents, anti-bacterial additives, anti-fungal additives, anti-yeast additives, urea or urease inhibitors, and/or other additives in an amount no greater than 10% and preferably in an amount no greater than about 5% of the admixture by dry admixture weight. Such a preferred corn admixture preferably contains no more than 25% moisture content by admixture weight. One preferred corn admixture contains no binders, adhesives, plasticizers, surfactants or emulsifiers and no binders, adhesives, plasticizer, surfactants or emulsifiers used or added during pellet extrusion.

Another preferred admixture is formed of substantially completely of sorghum and the admixture can contain as much as 40% fiber by dry admixture weight. The sorghum used preferably is whole grain sorghum that has not been de-corticated or de-germed. Where the sorghum admixture contains fiber, the admixture preferably contains between 5% and 30% fiber and can contain between 10% and 25% fiber. The balance of the admixture can contain other additives including colorant, dye, fragrances, scents, anti-bacterial additives, anti-fungal additives, anti-yeast additives, urea or urease inhibitors, and/or other additives in an amount no greater than 10% and preferably in an amount no greater than 5% of the admixture by dry admixture weight. Such a preferred sorghum admixture preferably contains no more than 20% moisture content by admixture weight. One preferred sorghum admixture contains no binders, adhesives, plasticizers, surfactants or emulsifiers and no binders, adhesives, plasticizer, surfactants or emulsifiers used or added during pellet extrusion.

In a method of making self-clumping granular sorbent of the present invention, starch-containing admixture, preferably cereal grain admixture, and more preferably corn and/or sorghum admixture, is extruded by an extruder 46, preferably a single screw extruder, of a granular absorbent extrusion system 40 of the present invention at an extruder temperature of at least 100 degrees Celsius and at an extruder pressure of at least 800 pounds per square inch (PSI) producing extruded sorbent pellets 42 having at least 10% cold water-soluble starches by uncoated pellet weight, including sufficient cold water-soluble binder formed in each pellet 42 from starch in the admixture during extrusion for the cold water-soluble binder to form a flowable adhesive that flows from pellets 42 when wetted with water enabling clumping of wetted pellets 42 during sorbent use. In a preferred method, corn or sorghum admixture is extruded at these extruder pressure and temperature parameters in a single screw extruding without adding any water or steam during extrusion forming sorbent pellets 42 each having at least 10% cold water soluble starch binder formed of starch in the admixture during extrusion extruding pellets 42 each having an amount of cold water soluble starch binder, including at least some cold water soluble binder in an outer surface of each pellet 42, sufficient for at least some water soluble binder in each wetted pellet 42 to dissolve or solubilize and flow between adjacent pellets 42 clumping, i.e., "self-clumping," at least a plurality of pairs, i.e., at least three, of the pellets 42 during sorbent use forming a clump of the pellets 42.

In one preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 15% cold water-soluble starches in each pellet 42 by uncoated pellet weight formed from starch in the admixture preferably converted or melted during extrusion into cold water soluble starches during extrusion that includes at least 10% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 15% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42.

In another preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 20% cold water-soluble starches in each pellet 42 by uncoated pellet weight formed from starch in the admixture preferably converted or melted during extrusion into cold water soluble starches during extrusion that includes at least 15% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 20% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42.

In a further preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 25% cold water-soluble starches in each pellet 42 by uncoated pellet weight formed from starch in the admixture preferably converted or melted during extrusion into cold water soluble starches during extrusion that includes at least 15% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 25% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42.

In still another preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 30% cold water-soluble starches in each pellet 42 by uncoated pellet weight formed from starch in the admixture preferably converted or melted during extrusion into cold water soluble starches during extrusion that includes at least 25% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 30% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42.

In a further preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 35% cold water-soluble starches in each pellet 42 by uncoated pellet weight formed from starch in the admixture preferably converted or melted during extrusion into cold water soluble starches during extrusion that includes at least 30% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 35% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42.

In yet another preferred method of extruding self-clumping granular sorbent of the present invention, the admixture is extruded by the extruder 46 at an extruder temperature of at least 120 degrees Celsius, preferably at least 140 degrees Celsius, and at an extruder pressure of at least 900 PSI, preferably at least 1000 PSI, extruding sorbent pellets 42 each having at least 40% cold water-soluble starches in each pellet 42 by uncoated pellet weight formed from starch in the admixture preferably converted or melted during extrusion into cold water soluble starches during extrusion that includes at least 35% cold water soluble starch binder in each pellet 42 sufficient for pellets 42 wetted with water to clump, e.g. "self-clump" producing self-clumping granular sorbent 44 of the present invention. In a preferred method, corn or sorghum admixture is extruded without adding any water or steam during extrusion forming sorbent pellets 42 each having at least 40% cold water soluble starch binder formed of starch in the admixture during extrusion containing an amount of cold water soluble starch binder in an outer surface of each pellet 42 wetted with water to dissolve or solubilize and flow between adjacent pellets 42 clumping at least a plurality of pairs, i.e., at least three, of pellets 42 together forming a clump of the pellets 42. The pellets 42 can be round, generally cylindrical, concave, convex, disk-shaped, flat, be irregularly shaped or have another shape.

Extruded porous and/or void-filled expanded or puffed sorbent pellets 42 are preferably formed having sizes, i.e. lengths and/or widths/diameters, ranging between 0.3 millimeter and 3.2 millimeters, preferably between 0.4 millimeter and 3 millimeters, a moisture content of no greater than 15%, preferably less than 13%, by uncoated pellet weight, an uncoated pellet bulk density ranging between 5 pounds per cubic foot and 50 pounds per cubic foot, preferably between 7 pounds per cubic foot and 40 pounds per cubic foot, and a water absorptivity of being able to absorb at least three times, preferably at least five times, uncoated pellet weight in water. Where the pellets 42 are to be used as granular sorbent in uncoated form, the porous and/or void-filled pellets 42 are formed having sizes, i.e. lengths and/or widths/diameters, ranging between 0.5 millimeter and 3 millimeters, preferably between 0.6 millimeter and 2.8 millimeters, a moisture content of no greater than 14%, preferably no greater than 12%, by uncoated pellet weight, an uncoated pellet bulk density ranging between 18 pounds per cubic foot and 45 pounds per cubic foot, preferably between 20 pounds per cubic foot and 35 pounds per cubic foot, and a water absorptivity of being able to absorb at least three times, preferably at least five times, uncoated pellet weight in water.

Where the pellets 42 are to be coated, such as with a smectite, preferably bentonite, e.g., powdered bentonite, the pellets 42 are formed having sizes, i.e. lengths and/or widths/diameters, ranging between 0.3 millimeter and 3.2 millimeters, preferably between 0.4 millimeter and 3 millimeters, a moisture content of no greater than 14%, preferably no greater than 12%, by uncoated pellet weight, an uncoated pellet bulk density ranging between 4 pounds per cubic foot and 18 pounds per cubic foot, preferably between 6 pounds per cubic foot and 12 pounds per cubic foot, and a water absorptivity of being able to absorb at least three times, preferably at least five times, uncoated pellet weight in water. After coating, the coated sorbent pellets preferably have sizes, i.e. lengths and/or widths/diameters, ranging between 0.5 millimeter and 5 millimeters, preferably between 0.5 millimeter and 4 millimeters, a moisture content of no greater than 14%, preferably no greater than 12%, by coated pellet weight, an coated pellet bulk density ranging between 18 pounds per cubic foot and 50 pounds per cubic foot, preferably between 20 pounds per cubic foot and 40 pounds per cubic foot, and a water absorptivity of being able to absorb at least four times, preferably at least five and a half times, coated pellet weight in water.

Each clump formed from such cold water-soluble starch and/or cold water-soluble starch binder containing extruded sorbent pellets 42 of the present invention during sorbent use has a clump crush strength of at least 25 pounds per square inch (PSI) and a clump retention or clump retention rate of at least 80%, preferably at least 90%, and more preferably at least 95%, when the clump is dried to a moisture content of no greater than 15% and preferably between 6%-12% by dry or dried clump weight when substantially dry. Clump retention or clump rate is determined using standard clay-based cat or animal litter clump retention or clump retention rate test standards, test methods or testing as known in the cat or animal litter art. Clump crush strength preferably is tested by placing a corresponding weight, e.g., 25 pounds, 30 pounds, 40 pounds, 50 pounds and/or 65 pounds, on a one inch by one inch square or block of the clump after the clump has hardened to a moisture content no greater than 15% that preferably is between 6% and 12% by clump weight and determining the weight above which the clump crushes, crumbles or otherwise falls apart.

In one such preferred granular sorbent embodiment, each clump formed of such cold water-soluble starch-containing and/or cold water-soluble starch binder-containing extruded sorbent pellets 42 of the present invention has a clump crush strength of at least 30 PSI and a clump retention or clump retention rate of at least 80%, preferably at least 90%, and more preferably at least 95%, when the clump is or becomes substantially dry. In another preferred granular sorbent embodiment, each clump formed of such cold water-soluble starch-containing and/or cold water-soluble starch binder-containing extruded sorbent pellets 42 of the present invention has a clump crush strength of at least 40 PSI and a clump retention or clump retention rate of at least 90%, preferably at least 95%, and more preferably at least 97%, when the clump is substantially dry. In still another preferred embodiment, each clump formed of such cold water-soluble starch-containing and/or cold water-soluble starch binder-containing extruded sorbent pellets 42 of the present invention has a clump crush strength of at least 50 PSI and a clump retention or clump retention rate of at least 95%, preferably at least 97%, and more preferably at least 99%, when the clump is substantially dry. In a further preferred embodiment, each clump formed of such cold water-soluble starch and/or cold water-soluble starch binder containing extruded sorbent pellets 42 of the present invention has a clump crush strength of at least 65 PSI and a clump retention or clump retention rate of at least 95%, preferably at least 97%, and more preferably at least 99%, when the clump is substantially dry.

Pellet Quenching Method and Pellet Quenching Apparatus

Where an extruder 46 of a granular absorbent extrusion system 40 constructed in accordance with the present invention is equipped with a pellet quenching apparatus 48, the pellet quenching apparatus 48 is disposed at a pellet discharge end 50 of the extruder 46 and quenches each pellet 42 extruded by the extruder 46. The pellet quenching apparatus 48 uses a fluid, preferably a gas, more preferably air, to quench each extruded pellet 42 during extruder operation. In a preferred pellet quenching apparatus 48, the quenching gas is air but can be another suitable gas, such as nitrogen, helium, argon, or gas mixture.

A preferred embodiment of a granular absorbent extrusion system 40 constructed in accordance with the present invention is depicted in FIGS. 1-6 and includes a pellet quenching apparatus 48 is constructed and arranged to quench each extruded pellet 42 by rapidly cooling each pellet 42 upon extrusion enough to consolidate and/or set the phase or state of one or more converted or modified starches formed in each pellet 42 during extrusion preferably before each quenched extruded pellet 42 is transported from the extruder 46 for subsequent cooling, drying, coating, classification, mixing, storage and/or packaging. In a preferred pellet quenching apparatus 48 and pellet quenching method in accordance with the present invention, the pellets 42 are quenched upon extrusion using a sufficient volumetric flow rate of gas at low enough temperature and moisture content, e.g. humidity, to rapidly cool the extruded pellets 42 from an initial pellet extrusion temperature of the pellets 42 immediately upon pellet extrusion to a quenched pellet temperature that is at least 15 degrees Celsius or at least 30 degrees Fahrenheit less than the pellet extrusion temperature when the pellets 42 are removed from the extruder 46, preferably when being drawn out the pellet discharge 74. Quenching of the pellets 42 preferably also flash dries the pellets 42 such that the pellets 42 have a moisture content no greater than 18%, preferably no greater than 15%, by uncoated pellet weight, when the quenched extruded pellets 42 exit the extruder 46 via the pellet discharge 74. In a preferred quenching apparatus and method, extruded pellets 42 quenched substantially immediately upon extrusion are cooled to a temperature no greater than 83 degrees Celsius or 180 degrees Fahrenheit and dried to a moisture content no greater than 18%, preferably no greater than 15%, by uncoated pellet weight by the time the quenched extruded pellets 42 leave the extruder 46 and enter the pneumatic conveyor 99 via the pellet discharge 74.

In another preferred pellet quenching apparatus embodiment and pellet quenching method, quenching cools the pellets 42 extruded by the extruder 46 at least about 20 degrees Celsius or at least about 35 degrees Fahrenheit below the initial pellet extrusion temperature by the time the quenched extruded pellets 42 are removed from the extruder 46 by being suctioned out the pellet discharge 74. Quenching of the pellets 42 preferably also flash dries the pellets 42 such that the pellets 42 have a moisture content no greater than 15%, preferably no greater than 13%, by uncoated pellet weight, when the quenched extruded pellets 42 exit the extruder 46 via the pellet discharge 74. In a preferred quenching apparatus and method, extruded pellets 42 quenched substantially immediately upon extrusion are cooled to a temperature no greater than about 80 degrees Celsius or no greater than about 175 degrees Fahrenheit and dried to a moisture content no greater than 15% by uncoated pellet weight by the time the quenched extruded pellets 42 leave the extruder 46 and enter the pneumatic conveyor 99 via the pellet discharge 74.

In one preferred pellet quenching apparatus embodiment and method, air is used to quench each pellet 42 immediately upon extrusion to cool and/or dry each extruded pellet 42 before transport from the extruder 46 in a manner that consolidates each pellet 42 by stabilizing pellet structure, facilitating cold water-soluble starch formation, preventing loss of cold water-soluble starches, preserving pellet surface integrity, and/or preventing post-extrusion pellet shrinkage. A preferred pellet quenching apparatus 48 and pellet quenching method cold quenches each extruded pellet 42 with air having a temperature less than drying oven temperature, preferably less than 100 degrees Celsius (212 degrees Fahrenheit), more preferably less than 85 degrees Celsius (about 185 degrees Fahrenheit), helping to stabilize the structure of converted or modified amylose and amylopectin starches in each pellet 42 in a manner that increases pellet strength while also advantageously increases the amount of cold water-soluble starches, including the amount of cold water-soluble binder, available in each pellet 42 during sorbent use. One preferred pellet quenching apparatus 48 and pellet quenching method cold quenches each extruded pellet 42 with air at room temperature having a temperature preferably between 18 degrees Celsius (about 64 degrees Fahrenheit) and 26 degrees Celsius (about 79 degrees Fahrenheit). In one preferred pellet quenching apparatus 48 and pellet quenching method, air at a temperature no greater than 28 degrees Celsius (about 82 degrees Fahrenheit) is drawn into the pellet quenching apparatus 48 and used to cold quench each extruded pellet 42.

With continued reference to FIGS. 1-6, the pellet quenching apparatus 48 includes a quenching gas supply 52 and a quenching gas delivery arrangement 54 that transports quenching gas from the supply 52 to the discharge end 50 of the extruder 46. In a preferred embodiment, the gas delivery arrangement 54 is in fluid flow communication with a pellet quenching chamber 45 formed at least in part by a knife cage 56 that encloses the discharge end 50 of the extruder 46 that is at least part of an extrudate discharge chamber 47 into which pellets 42 are discharged as they are extruded. During operation of the quenching apparatus 48, quenching gas from the supply 52 is conveyed by the delivery arrangement 54 into the pellet quenching chamber 45 by introducing quenching gas into the knife cage 56 (shown in phantom) during extruder operation to quench the extruded pellets 42 before the pellets 42 are transported from the extruder 46. Since the pellet quenching apparatus 48 is intended for use with extruder 46, the extruder 46 is first described below before returning to describe the quenching apparatus 48 in more detail.

The extruder 46 has an elongate generally cylindrical barrel 58 carrying a circular or disk-shaped perforate extrusion die 60 from which at least a plurality of pairs, i.e., at least three, of pellets 42 are extruded per second during extruder operation. The pellets 42 are formed from "ropes"

or strings of extrudate (not shown) exiting substantially simultaneously from a plurality of pairs of bores or openings 61 (FIG. 6) in the die 60 which are cut into pellets 42 by a rotary cutter 62 on a cutting shaft 64 rotated by an electric motor 66 during extruder operation. During extrusion, the "ropes" or strings of extrudate are squeezed out or flow from the die openings 61 in an axial direction generally parallel to an axis of rotation of the cutter shaft 64 toward the rotary cutter 62, which slices them into pellets 42.

The knife cage 56 is a protective housing that encloses a discharge end 68 of the extruder barrel, the die 60, cutter 62, and part of the cutter shaft 64. The knife cage 56 can be generally rectangular, e.g., square, having a top wall 73 and a plurality of pairs of sidewalls 75, 77, 79 and 81. The knife cage 56 overlies a bottom opening 70 through which pellets 42 in the knife cage 56 pass into a pellet-collecting hopper 71, e.g. pellet collector 72, which can form or be part of the extrudate discharge chamber 47. The knife cage 56 has a necked down funnel 83 at its bottom that helps direct or funnel pellets 42 into the opening 70 of the pellet collector 72. Pellets 42 received in the pellet collector 72 after passing through the knife cage 56 are conveyed therefrom via a pellet discharge 74 in fluid-flow communication with a bottom portion of the collector 72.

The pellet collector 72, e.g., hopper 71, can also be generally rectangular, e.g., square. As best shown in FIGS. 1 and 2, the collector 72 is formed of a top 76, plurality of pairs of sidewalls 78, 80, 82, 84, and a bottom 86 forming a pellet collecting hopper 71, e.g., pellet collector 72, which can be gravity fed by the knife cage 56 during extruder operation. While the pellet collector 72 can be and preferably is of generally gas-tight, i.e., airtight, construction, one or more of top, walls and bottom, 76, 78, 80, 82 and/or 84 can include one or more ports (not shown) through which ambient atmosphere outside the collector 72 and extruder 46 can enter during operation. One of the walls 78 of the pellet collector 72 can include an access door 88 which can be equipped with a sight glass 90 in the form of a transparent panel made of plastic, e.g. clear acrylic, glass, e.g., tempered glass, or another suitable see-through material. The sight glass 90 enables viewing inside the pellet collector 72 during operation and the access door 88 provides access inside the collector 72 when needed to clean, service or otherwise inspect inside the collector 72.

As is best shown in FIG. 1, the pellet discharge 74 includes at least one duct and preferably a plurality of elongate hopper pellet discharge ducts 92, 94 that each can independently and preferably both substantially simultaneously convey pellets 42 received in the pellet collector 72 away from the extruder 46. The ducts 92, 94 can be generally horizontal, spaced apart, and generally parallel to one another arranged in a side-by-side arrangement with each duct 92, 94 in fluid-flow communication with opposite sides of the collector 72 adjacent the hopper bottom 86 to better prevent pellet accumulation during extruder operation.

The ducts 92, 94 can converge using a wye 96 into an elongate common pellet discharge conduit 98, only a portion of which is shown in FIG. 1, used to transport pellets 42 from the pellet collector 72 to a location remote from the extruder 46 where the pellets 42 can be processed such as by cleaning, abrading, classifying, drying, treating and/or packaging the pellets 42. In a preferred embodiment, the ductwork of the discharge 74 is part of a pneumatic conveyor 99 to which a plurality of extruders 46 are connected to substantially simultaneously transport pellets 42 as they are extruded from a plurality of extruders 46 operating at the same time in the same plant or production facility.

During pneumatic conveyor operation, one or more blowers, fans, or other air moves are operated to move air through the ductwork of the pneumatic conveyor 99 transporting pellets 42 from the pellet collector 72 of each extruder 46 to at least one remote location. Air flowing through the ductwork preferably sucks pellets 42 from at or adjacent the bottom of the collector 72 into one or both ducts 92, 94, including substantially simultaneously, transporting the pellets 42 conduit 98 to the at least one remote location. Doing so preferably creates a pressure differential within the pellet collector 72, e.g. a vacuum, which facilitates sucking pellets 42 in the collector 72 into ducts 92, 94.

Where the granular absorbent extrusion system 40 is equipped with a pellet quenching apparatus 48, the pellet quenching apparatus 48 and pneumatic conveyor 99 can form a push-pull extruded pellet transport system 101 with extruded gas delivered into the quenching chamber 45, preferably introduced into the knife cage 56, at a positive pressure, i.e., pressure greater than ambient pressure, and air sucked from the pellet collector 72 via ducts 92 and/or 94 at a negative pressure, i.e. pressure less than ambient pressure. In such a push-pull pellet transport system 101, quenching air gas flow transports extruded pellets 42 during quenching from the knife cage 56 into the collector 72 where suction from the pneumatic conveyor 99 draws the pellets 42 into one of the ducts 92, 94.

The pellet collector 72 and discharge ducts 92, 94 are anchored to a base 100 that can be carried on wheels 102 enabling the collector 72, knife cage 56, and cutter 62 to be moved away from the discharge end 50 of the extruder 46 such as to move the cutter 62 away from the die 60. The pellet collector 72 preferably is fixed to the base 100 and the ducts 92, 94 anchored by a generally L-shaped angle bracket 104. In a preferred embodiment, the collector 72 and ducts 92, 94 are movably carried by a wheeled dolly 106 with the collector 72 and 92, 94 anchored to a platform 100 of the dolly 106 enabling the collector 72, cutter 62 and the like to be wheeled away from the extruder 46 when desired.

The top 76 of the pellet collector 72 can include or provide a platform 108 carrying the knife cage 56 and cutter motor 66. The knife cage 56 can be anchored to the platform 108 such as by being removably attached thereto by one or more fasteners, brackets, another fastening arrangement, e.g., a hook and loop fastener arrangement, or the like. The cutter motor 66 preferably is removably anchored to the platform 108 by a mounting bracket 110 removably fixed by fasteners or the like.

Figure 5:
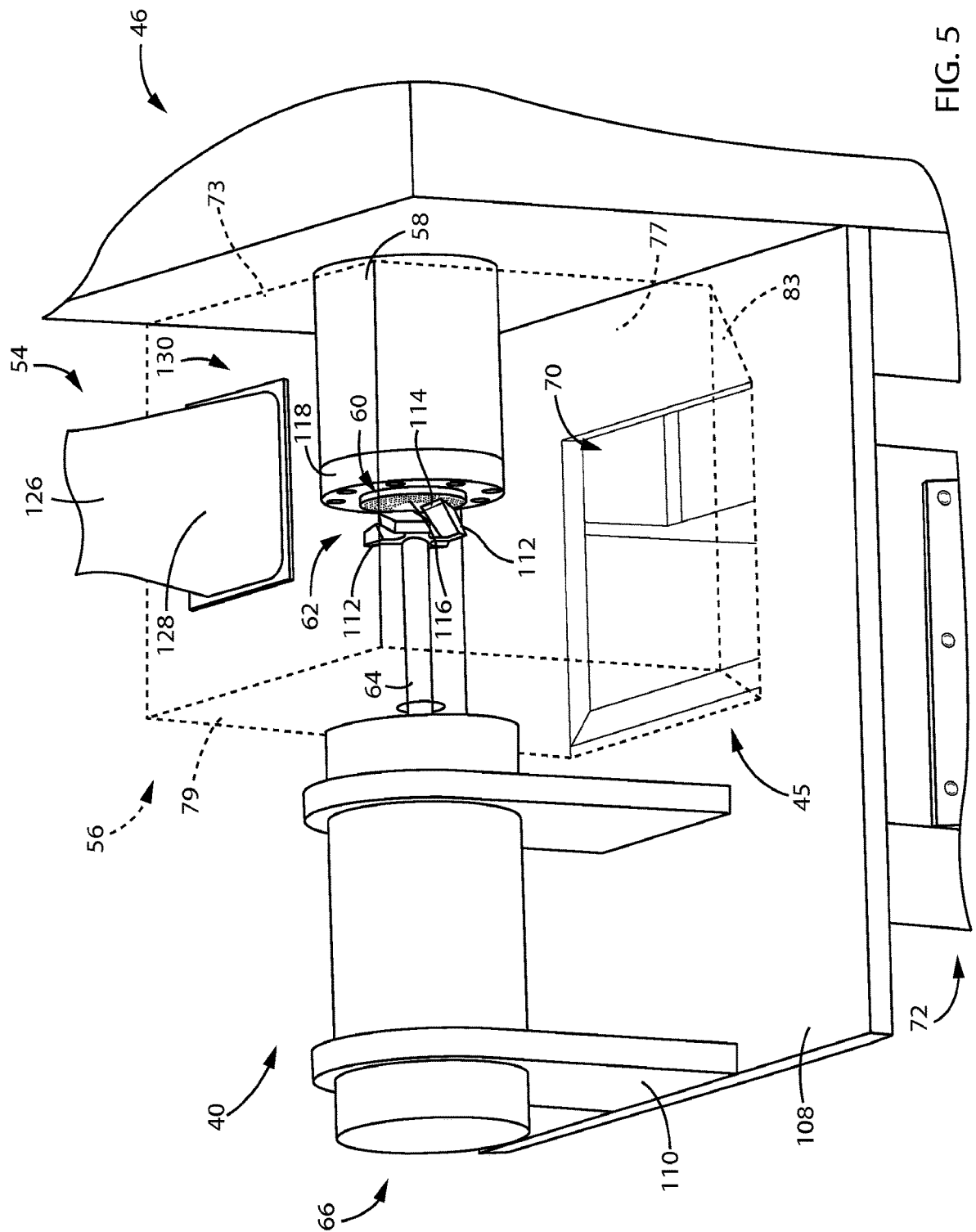
FIG. 5 is a fragmentary top perspective view of the discharge end of the extruder and part of the extrudate discharge chamber illustrating the quenching air plenum in phantom.
Figure 6:
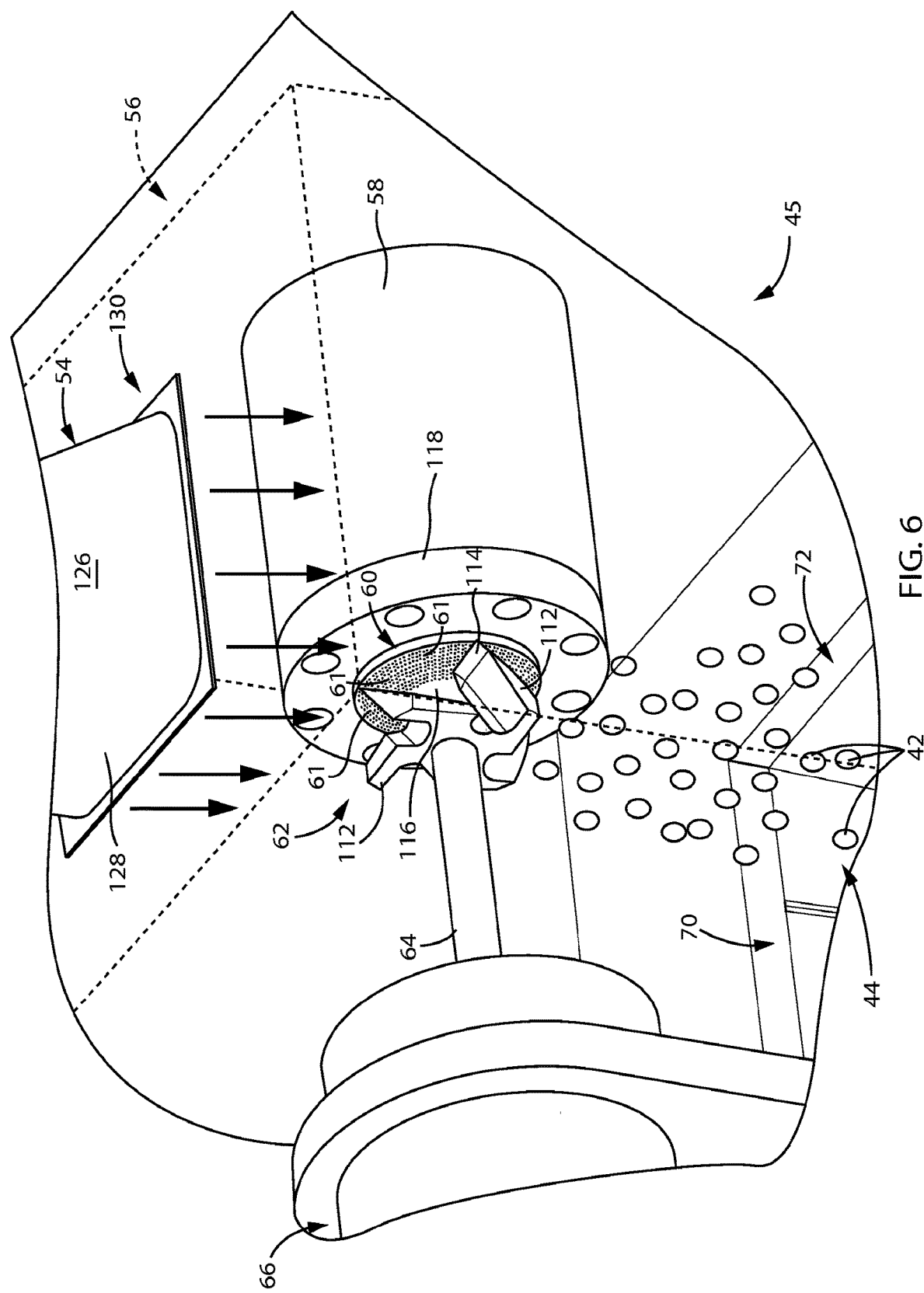
FIG. 6 is an enlarged fragmentary view of the quenching air plenum shown in phantom depicting engagement of a rotary cutter with a perforate extruder die carried by a discharge end of a barrel of the extruder.

When the pellet collector 72 and dolly 106 are disposed in the operating position shown in FIG. 1, the cutter 62 is disposed against the extruder die 60. As best shown in FIGS. 5 and 6, the cutter 62 has a plurality of radially extending cutter arms 112 each carrying a cutting knife 114 disposed in slidable contact with an axial cutting face 116 of the die 60 with die 60 removably mounted in a die holder 118 secured with fasteners (not shown) to the discharge end of the extruder barrel 58. During extruder operation, rotation of the arms 112 of the cutter 62 causes the cutter knives 114 to slidably engage the cutting face 116 of the die 60 cutting at least a plurality of pairs, i.e., at least three of "ropes" of extrudate exiting the die openings 61 (FIG. 6) into at least a plurality of pairs, i.e., of pellets 42 per second. During extruder operation, the cutter 62 preferably is rotated at a speed of between 6,000 RPM and 10,000 RPM.

The extruded pellets 42 are received in an extrudate discharge chamber 47 before the pellets 42 are removed or discharged from the extruder 46 by being sucked or drawn from the extrudate discharge chamber 47 through pellet discharge 74 where the pellets 42 are transported via flowing air to a location remote from the extruder 46. The pellet quenching chamber 45 is formed of or includes at least part of the extrudate discharge chamber 47 and can be formed of or include the entire extrudate discharge chamber 47. In a preferred embodiment, the extrudate discharge chamber 47 includes at least the pellet collector 72, e.g., hopper 71, and can and preferably does also include the knife cage 56. The quenching chamber 45 includes at least the knife cage 56 and can and preferably does also include the pellet collector 72, i.e., hopper 71.

Where the knife cage 56 and pellet collector 72 are one and the same, e.g., formed as a single unit, such a single unit defines both the quenching chamber 45 and the extrudate discharge chamber 47. Therefore, a pellet quenching apparatus 48 of the present invention contemplates an extrudate discharge chamber 47 formed of a housing or enclosure substantially completely enclosing the discharge end 50 of the extruder 46 that functions as both the knife cage 56 and pellet collector 72, which can be a single housing or enclosure extending generally vertically from adjacent the extruder die 60 to the pellet discharge 74 used to remove pellets 42 from the extruder 46.

Where the granular absorbent extrusion system 40 is equipped with a pellet quenching apparatus 48, extruded pellets 42 of granular sorbent 44 having one or more of the beneficial absorption and adsorption characteristics and water soluble binder adherence or clumping properties discussed elsewhere herein are optimized by quenching the pellets 42 upon extrusion before the pellets 42 are transported from the extruder 46. The quenching apparatus 48 includes a quenching gas supply 52 that supplies quenching gas during extruder operation that is transported via the quenching gas delivery arrangement 54 to a quenching chamber 45 that includes the knife cage 56 to rapidly cool and preferably also dry the extruded pellets 42 before the pellets 42 are transported from the extruder 46. Quenching chamber 45 can include the hopper 71 or pellet collector 72. In a preferred embodiment, the quenching apparatus 48 is an air quenching apparatus 48 that includes a quenching air supply 52 that supplies quenching gas in the form of air delivered via a quenching air delivery arrangement 54 into the knife cage 56 at a high enough volumetric flow rate, low enough temperature, and low enough humidity or moisture content to air quench and preferably also dry the pellets 42.

In a preferred quenching apparatus embodiment, the quenching supply 52 includes a pump 118 that preferably is a fan, blower, compressor or other type of air mover 120 that draws quenching air in through an intake 122 and outputs quenching air through a discharge 124 to a quenching air delivery arrangement 54 that is or includes an elongate quenching air delivery conduit 126. While the intake 122 of the air mover 120 can be in gas flow communication with a source of quenching air (not shown), the intake 122 preferably is in gas flow communication with the ambient atmosphere, e.g., outside air or air outside of the extruder 46. The quenching air delivery conduit 126 can be a flexible or bendable duct having an inlet 127 in fluid-flow communication with the air mover discharge 124 at one end and an outlet 128 at an opposite end in fluid-flow communication with the atmosphere inside the quenching chamber 45.

The outlet 128 of the quenching air delivery conduit 126 is attached to the quenching chamber 45 forming a plenum 130 therewith such that flow of quenching air into the quenching chamber 45 positively pressurizes at least a portion of the quenching chamber 45 to a pressure greater than ambient. In the preferred embodiment shown in FIGS. 1-6, the outlet 128 of the quenching air delivery conduit 126 is attached to the top wall 73 of the knife cage 56 forming plenum 130 with the knife cage 56 positively pressurizing at least the atmosphere within the knife cage 56 during quenching during extruder operation. In a preferred pellet quenching apparatus 48, quenching air directed from the outlet 128 of the quenching air delivery conduit 126 into the quenching chamber 45 positively pressurizes at least that portion of the atmosphere within the chamber 45 contacting and surrounding the pellets 42 as they are being extruded from the die 60 and cut by the rotary cutter 62. In contrast, the hopper 71 or pellet collector 72 can be negatively pressurized below ambient pressure from the suction of the air conveyor 99 used to draw the extruded pellets 42 from the collector 72 into the pellet discharge 74 when removing the pellets 42 from the extruder 46.

While knife cage 56 can be of perforate construction, e.g., wire-mesh or perforate stainless steel, a preferred knife cage 56 is modified to be a substantially gas tight headbox 59 having an imperforate top wall 73, imperforate sidewalls 75, 77, 79 and/or 81, and/or an imperforate pellet directing funnel 83. Such a knife cage 56, e.g. headbox 59, is substantially gas-tight or air-tight in that it may not be completely airtight, such as where the cutter shaft 64 and/or extruder barrel 58 are received therein, but is substantially gas tight by being gas tight enough to produce a positive pressure differential with ambient pressure within the knife cage 56 during receipt of quenching air during quenching pellet apparatus operation. Use of a substantially gas-tight head box 59 that also functions as a knife cage 56 helps maintain a positive pressurization within the quenching chamber 45 while also helping to direct flow of quenching air therethrough into the pellet collector 72 transporting the pellets 42 thereto preferably without contacting the head box 59 or knife cage 56.

Pellet collecting hopper 71, e.g., pellet collector 72, can also be of substantially gas tight construction by being formed with an imperforate top wall 76, imperforate sidewalls 78, 80, 82 and/or 84, and/or an imperforate bottom wall 86. As with the knife cage 56, e.g. headbox 59, the hopper 71 may not be completely airtight, such as due to leakage from where one or more of the walls 76, 78, 80, 82, 84, and/or 86 are joined together and/or door 88, the hopper 71 is sufficiently gas tight to produce a negative pressure differential with ambient pressure during operation of the pneumatic conveyor 99.

As best shown in FIGS. 3-6, the outlet 128 of the quenching air delivery conduit 126 can include a divergent or outwardly flared flow expander 131 that helps distribute the flow of quenching air more uniformly throughout the quenching chamber 45, e.g., knife cage 56, to help more uniformly quench the pellets 42 during operation. As is best shown by the arrows in FIGS. 3 and 4 downwardly extending from the quenching air delivery conduit outlet 128, flow of quenching air is directed not only on pellets 42 as they are being extruded from the die 60 and cut by the rotary cutter 62, but quenching air also is directed on the pellets 42 after they have been by the cutter 62 while the extruded pellets 42 still reside in the quenching chamber 45, e.g., knife cage 56. More uniform distribution of the quenching air within the quenching chamber 45 by using such a flow expander 131 more uniformly quenches the pellets 42 while also providing at least some of the benefits of an air knife by advantageously preventing pellets 42 from adhering to any part of the knife cage 56, die 60, rotary cutter 62, and/or cutter shaft 64 during extruder operation.

In a preferred embodiment, the outlet 128 of the quenching air delivery conduit 126 axially overlaps the die 60 and rotary cutter 62, and can axially overlap part of the cutter shaft 64 and/or extruder barrel 58, including part of the free end or discharge and of the barrel 58, e.g., die holder 118. If desired, the quenching air delivery conduit outlet 128 can be oriented generally perpendicular to the axis of the cutter shaft 64 and generally perpendicular to the direction pellets 42 flow out of the die openings 61 during extrusion to help direct each pellet 42 substantially immediately upon being cut from the die 60 by the cutter 62 toward the knife cage exit opening 70 and/or pellet collector inlet opening 70 to minimize residency time in the knife cage 56 and/or pellet collector 72 before being transported out the pellet discharge 74.

Figure 3:
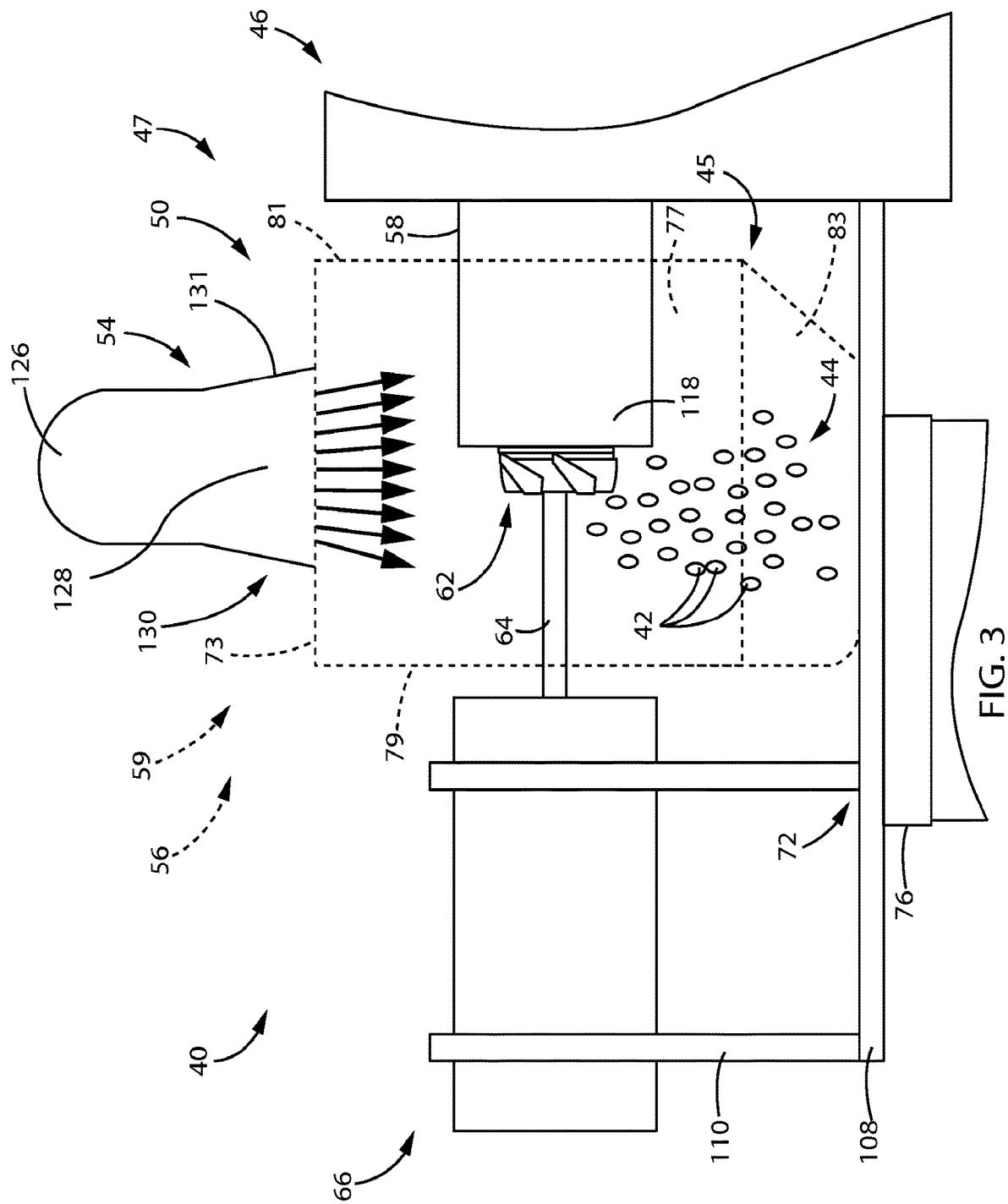
FIG. 3 is enlarged side elevation view of pellet quenching air plenum of the pellet quenching apparatus formed of a pellet quenching air flow distributor and knife cage shown in phantom that preferably is substantially air-tightly sealed forming a substantially gas-tight headbox.
Figure 4:
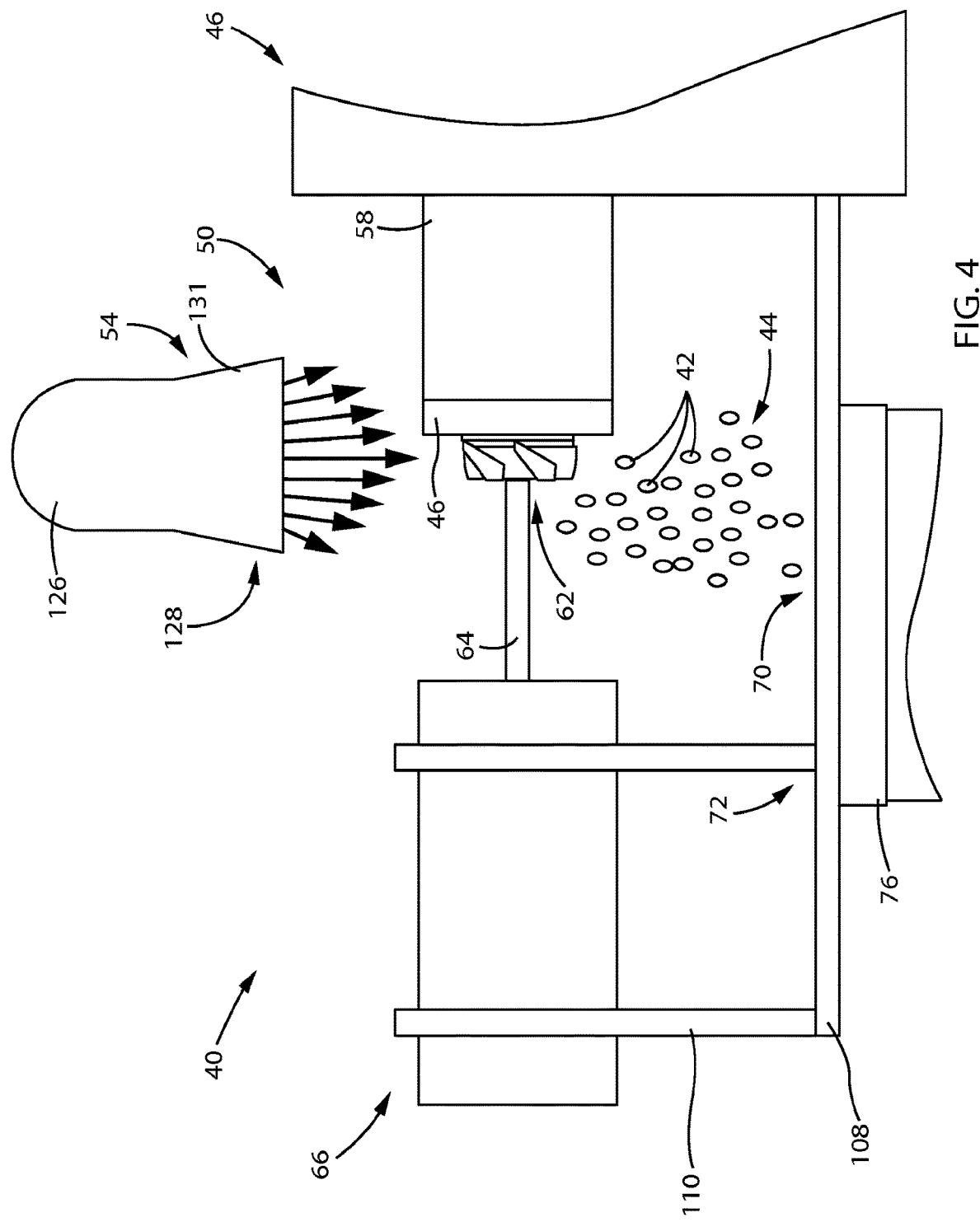
FIG. 4 is enlarged side elevation view of part of the extrudate discharge chamber at the discharge end of the extruder with the knife cage removed for clarity depicting the pellet quenching air flow distributor blowing pellets as they extruded into a pellet collector below.

In one preferred embodiment, the quenching air delivery conduit outlet 128 is generally in line with the knife cage exit opening 70 and/or pellet collector inlet opening 70 so that pellets 42 become entrained in the flow of quenching air during pellet quenching relatively rapidly transporting the pellets 42 from the knife cage 56 into the pellet collector 72. As is best shown in FIG. 4, outlet 128 is in line with the die 60, rotary cutter 62, and opening 70 between the knife cage 56 and pellet collector 72 with flow of quenching air from the outlet 128 being directed generally downwardly towards the die 60, cutter 62 and opening 70. During pellet quenching apparatus operation, a stream or flow of quenching air, as indicated by generally downwardly extending un-numbered quenching air flow arrows in FIGS. 3, 4 and 6, discharged from the quenching air delivery conduit outlet 128 impinges against the pellets 42 as the pellets 42 are being cut and separated from the extruder die 60 directing the extruded pellets 42 while quenching them from the knife cage 56 through opening 70 into the pellet collector 72 without contacting the knife cage 56. As is best shown in FIGS. 3, 4 and 6, the flow of quenching air discharged from outlet 128 is generally perpendicular an axis of rotation or lengthwise extent of the cutter shaft 64 and generally parallel with the axial face 116 of the extruder die 60 helping to substantially immediately direct pellets 42 as they are cut from the die 60 by the knives 114 of the cutter 62 free or clear of the die 60 and cutter 62 preventing any portion of any pellet 42 from sticking thereon or gumming either the die 60 or cutter 62.

This not only helps facilitate longer and more complete pellet quenching, the director in line flow arrangement of the quenching air delivery conduit 126 with opening 70 (and die 60 and cutter 62) advantageously enables extruder throughput to be increased allowing more pellets 42 to be extruded per second of extruder operation. This also not only prevents gumming up of the rotary cutter 62, the inline arrangement of the quenching air delivery conduit outlet 128, extruder die 60, rotary cutter 62 and opening between the knife cage 56 and pellet collector 72 propels the extruded pellets 42 as the pellets 42 are cut and separated from the die 60 by the rotary cutter 62 directly through the opening 70 into the pellet collector 72 without contacting the knife cage 56. This advantageously minimizing and preferably substantially completely prevents pellet-impact induced wear and damage, particularly to the knife cage 56. Doing so also keeps the knives 114 of the cutter 62 cooler, which not only prevents soluble starches in the extruded pellets 42 from condensing on, coating and/or gumming them but also advantageously extends rotary cutter knife life.

During operation of the pellet quenching apparatus 48, quenching air delivery conduit outlet 128 directs flow of quenching air into the knife cage 56 close enough to pellets 42 being extruded from the die 60 of the extruder 46 such that quenching of the pellets 42 starts to occur immediately upon pellet extrusion preferably even while the pellets 42 are being squeezed out the extruder die openings 61. Quenching continues while the extruded pellets 42 reside in the knife cage 56. Where the quenching chamber 45 includes the pellet collecting hopper 71, e.g., pellet collector 72, quenching preferably also continues while the extruded pellets 42 reside in the pellet collector 72 and preferably continues up until the pellets 42 are transported from the extruder 46 via the pellet discharge 74.

In a preferred pellet quenching apparatus embodiment, the air mover 120 preferably is a centrifugal fan or squirrel cage blower powered by an electrical motor that preferably is at least an about ¾ horsepower motor (0.55 kw motor) and which preferably is at least a 1.2 HP motor (0.9 kw motor) to provide air to the quenching chamber 45 at a volumetric flow rate of at least 500 cubic feet per minute (CFM) at an air temperature sufficiently below the pellet extrusion temperature and at a sufficiently low humidity, e.g., relative humidity, sufficient for pellet quenching to occur. In one embodiment, the air mover 120 is a centrifugal fan powered by at least an about ¾ HP motor (0.55 kw motor) and which preferably is at least a 1.2 HP motor (0.9 kw motor) that delivers air to the quenching chamber 45 having a sufficiently low humidity and temperature sufficiently less than the pellet extrusion temperature at a flow rate of at least 700 CFM sufficient for pellet quenching to occur. In one preferred embodiment, the air mover 120 is a centrifugal fan powered by at least an about a 1.2 HP motor (0.9 kw motor) and which preferably is at least a 2 HP motor (1.5 kw motor) that delivers air to the quenching chamber 45 having a sufficiently low humidity and temperature sufficiently less than the pellet extrusion temperature at a flow rate of at least 800 CFM and preferably at least 900 CFM sufficient for pellet quenching to occur. Such high volumetric flow rates of quenching air directed through the outlet 128 of the quenching air delivery conduit 126 into the quenching chamber 45 produces turbulent quenching air flow inside the quenching chamber 45 that causes turbulent convective cooling during pellet quenching in the quenching chamber 45.

In a preferred quenching apparatus embodiment and pellet quenching method, quenching of pellets 42 extruded by the extruder 46 is substantially completed by the time, e.g., pellet quench completion time, the pellets 42 are removed from the extruder 46 by being transported from the pellet collector 72 out the pellet discharge 74 to a remote location by the pneumatic conveyor 99. While quenching of each pellet 42 can continue while the pellet 42 is being transported via the pellet discharge 74 all the way up until the pellet 42 is delivered to the remote location, quenching of each pellet 42 is substantially completed by the time each pellet 42 is sucked out of the pellet collector 72 into the pellet discharge 74.

In a preferred method and embodiment, quenching of each pellet 42 extruded by the extruder 46 is substantially completed by a pellet quench completion time of no more than 3 seconds and preferably no more than 2.5 seconds after the pellet 42 is extruded by the extruder 46 by being cut and separated from the die 60 by the rotary cutter 62. In one preferred method and embodiment, quenching of each pellet 42 extruded by the extruder 46 is substantially completed by a pellet quench completion time of within about 2 seconds of the pellet 42 being extruded by the extruder 46. In one such preferred method and embodiment, quenching of each pellet 42 extruded by the extruder 46 is substantially completed by a pellet quench completion time that is no more than three seconds, preferably no more than two seconds, after being extruded such that each extruded pellet 42 is substantially completely clenched by the time the pellet 42 is removed from the extruder 46 by being suctioned or vacuumed out the pellet collector 72 into the pellet discharge 74.

A granular absorbent extrusion system 40 equipped with a pellet quenching apparatus 48 and employing a method of pellet quenching during extruder operation in accordance with the present invention quenches the pellets 42 immediately upon extrusion by rapidly reducing the temperature of each extruded pellet 42 from a temperature of the pellet 42 immediately upon extrusion when the pellet 42 is cut by the rotary cutter 62 from the die 60, i.e., initial pellet extrusion temperature, to a temperature sufficiently less than the pellet extrusion temperature that quenches the pellet 42 such that the as-extruded structure of the outer surface of the pellet 42, including pores, three-dimensional surface roughness, such as uneven surface portions, surface irregularities, such as protrusions, cracks, and surface discontinuities, such as craters and indentions, formed in the pellet outer surface, are substantially completely retained. Such a granular absorbent extrusion system 40 having a pellet quenching apparatus 48 carrying out pellet quenching during extruder operation forms extruded pellets 42 upon quenching having at least a plurality of pores and at least a plurality of at least one of depressions, protrusions and other surface roughness thereby producing quenched extruded pellets 42 in accordance with the present invention having increased pellet outer surface area. Such extruded quenched sorbent pellets 42 of the present invention with such increased outer surface area provides increased absorption and adsorption of both water and oil, e.g., water insoluble or water immiscible liquids, during sorbent use. Such extruded quenched sorbent pellets 42 having such increased outer surface area as a result of quenching preferably form sufficient starch-based flowable adhesive binder when wetted during sorbent use for wetted pellets 42 to adhere together and preferably form clumps that become substantially hard when dry.

A granular absorbent extrusion system 40 equipped with a pellet quenching apparatus 48 and carrying out pellet quenching in accordance with the present invention during extruder operation reduces and preferably helps prevent any further transformation of at least some of the starches present in the extruded pellet 42, including at least some starches converted by being modified, preferably physically modified, during extrusion. Rapid cooling of each pellet 42 during quenching reduces and preferably substantially completely prevents transformation of liquid soluble starches in each pellet 42 following extrusion preventing loss or reduction of liquid soluble starches thereby maximizing the amount of liquid soluble starches in each pellet 42, including cold water soluble starches, including amylopectin cold water soluble starch, helping to maximize liquid absorption and adsorption of at least water and preferably both water and oil. Such rapid cooling of each pellet 42 during quenching preferably also reduces and preferably also substantially completely prevents transformation of water soluble binders in each pellet 42 following extrusion preventing loss or reduction thereof thereby maximizing the amount of liquid soluble binders in each pellet 42, including cold water soluble binders, helping to maximize not only absorption and adsorption but also advantageously maximizes clumping and clump retention. Such rapid cooling of each pellet 42 during quenching preferably also reduces and preferably also substantially completely prevents transformation of converted or modified amorphous water soluble starches into crystalline starches in each pellet 42, e.g., by freezing the state of the amorphous water soluble starches thereby preventing retrogradation, crystallization and/or re-crystallization thereof, following extrusion preventing loss or reduction thereof thereby maximizing the amount of liquid soluble starches in each pellet 42, including cold water soluble starch binders, helping to maximize not only absorption and adsorption but also advantageously maximizes clumping and clump retention.

A granular absorbent extrusion system 40 equipped with a pellet quenching apparatus 48 and carrying out pellet quenching in accordance with the present invention during extruder operation rapidly solidifies at least the outer surface of each pellet 42, if not substantially solidifying the entire pellet 42, during substantially simultaneous rapid cooling and drying of each pellet 42 that occurs during pellet quenching. Rapid drying of each pellet 42 that occurs during quenching solidifies at least the outer surface of each pellet 42 by removing moisture from the outer pellet surface, including moisture within each pellet 42 that vaporizes during extrusion through the die opening 61, drying and therefore hardening the outer pellet surface. Rapid cooling of each pellet 42 that occurs during quenching also can and preferably does solidify at least the outer surface of each pellet 42 and preferably helps solidify at least a portion of the interior of the pellet 42 by rapidly retrograding starches, including amylose starches converted, including by physical modification, e.g. physically converted or physically modified amylose starches, during pellet extrusion forming a substantially solid, relatively stiff starch matrix in the pellet 42 after quenching.

Rapid drying caused by quenching advantageously also increases the rate of cooling, particularly immediately upon extrusion of each pellet 42 upon cutting of the pellet 42 from the die 60 by the rotary cutter 62, by causing evaporative cooling of each pellet 42 during and immediately upon extrusion by speeding the rate of evaporation of moisture from each pellet 42. Evaporative cooling occurs and preferably is increased by drying of each pellet 42 during quenching by speeding the rate of pellet surface evaporation and preferably also by speeding the rate of evaporation of moisture with each pellet 42 vaporized during extrusion.

Rapid drying during quenching causes evaporative cooling that advantageously quickly removes moisture vaporized from the pellet 42 substantially as quickly as the vaporized moisture is being expelled therefrom thereby preventing the moisture from solubilizing and/or dissolving water soluble starches, including cold water soluble starches, thereby preventing loss thereof advantageously preserving the amount of water soluble starches that were originally formed, including by physical conversion or modification, in each pellet 42 during extrusion. Rapid drying during quenching causes evaporative cooling that advantageously quickly removes moisture vaporized from the pellet 42 substantially as quickly as the vaporized moisture is being expelled therefrom thereby preventing the moisture from altering the amorphous state of water soluble starches, including cold water soluble starches, formed in each pellet 42 during extrusion thereby preventing loss thereof advantageously preserving the amount of water soluble starches, including cold water soluble starch binders, that were originally formed in each pellet 42, including by physical conversion or modification, during extrusion. Rapid drying during quenching causes evaporative cooling that advantageously quickly removes moisture vaporized from the pellet 42 substantially as quickly as the vaporized moisture is being expelled therefrom thereby preventing the moisture from altering the amorphous state of amorphous amylopectin cold water soluble starches, including amorphous amylopectin cold water soluble starch binders, formed in each pellet 42 during extrusion thereby preventing loss thereof advantageously preserving the amount of water soluble starches, including cold water soluble starch binders, that were originally formed in each pellet 42, including by physical conversion or modification, during extrusion by preventing their crystallization, re-crystallization, melting, further melting and/or degradation.

A granular absorbent extrusion system 40 equipped with a pellet quenching apparatus 48 and carrying out pellet quenching in accordance with the present invention during extruder operation preserves the size of each extruded pellet 42 by drying each pellet 42 beginning immediately while each pellet 42 is being squeezed out of the die holes 61 and following extrusion of each pellet 42 by the cutter 62 cutting the pellet 42 from the die 60 preventing pellet shrinkage that normally occurs during and immediately following extrusion. A method of pellet quenching using a pellet quenching apparatus 48 in accordance with the present invention maintains pellet size by substantially completely preventing pellet shrinkage of each pellet 42 extruded from extruder 46 producing extruded quenched pellets 42 having substantially the same size during sorbent use as when extruded from the die 60 and cut by rotary cutter 62.

A preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 25% from the original size of the pellet 42 when extruded out die opening 61 and cut by rotary cutter 62. Another preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 20% from the original size of the pellet 42 when extruded out die opening 61 and cut by rotary cutter 62. Still another preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 15% from the original size of the pellet 42 when extruded out die opening 61 and cut by rotary cutter 62. A further preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 10% from the original size of the pellet 42 when extruded out die opening 61 and cut by rotary cutter 62. A still further preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 7% from the original size of the pellet 42 when extruded out die opening 61 and cut by rotary cutter 62. Yet another preferred method of pellet quenching using a pellet quenching apparatus 48 in accordance with the present invention maintains pellet size by substantially completely preventing pellet shrinkage of each pellet 42 that ordinarily occurs during extrusion producing extruded quenched pellets 42 that each shrink less than 5% from the original size of the pellet 42 when extruded out die opening 61 and cut by rotary cutter 62.

A granular absorbent extrusion system 40 equipped with a pellet quenching apparatus 48 and carrying out pellet quenching in accordance with the present invention during extruder operation preserves the bulk density of each extruded pellet 42 by drying each pellet 42 beginning immediately while each pellet 42 is being squeezed out of the die holes 61 as well as immediately following extrusion of each pellet 42 by the cutter 62 cutting the pellet 42 from the die 60 preventing pellet density increases that normally occurs during and immediately following extrusion. A method of pellet quenching using a pellet quenching apparatus 48 in accordance with the present invention maintains pellet density by substantially completely preventing pellet shrinkage of each pellet 42 extruded from extruder 46 producing extruded quenched pellets 42 having substantially the same size during sorbent use as when extruded from the die 60 and cut by rotary cutter 62.

A preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 25% from the original density of the pellet 42 when extruded out die opening 61 and cut by rotary cutter 62. Another preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 20% from the original density of the pellet 42 when extruded out die opening 61 and cut by rotary cutter 62. Still another preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 15% from the original density of the pellet 42 when extruded out die opening 61 and cut by rotary cutter 62. A further preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 10% from the original density of the pellet 42 when extruded out die opening 61 and cut by rotary cutter 62. A still further preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 7% from the original density of the pellet 42 when extruded out die opening 61 and cut by rotary cutter 62. Yet another preferred method of pellet quenching using a pellet quenching apparatus 48 in accordance with the present invention maintains pellet density by substantially completely preventing increases in density of each pellet 42 that ordinarily occurs during extrusion producing extruded quenched pellets 42 that each increase in density less than 5% from the original density of the pellet 42 when extruded out die opening 61 and cut by rotary cutter 62.

Drying of each pellet 42 during quenching advantageously prevents pellet shrinkage and pellet densification that ordinarily occurs during and following extrusion by rapidly removing moisture from each pellet 42 upon and immediately following extrusion. Pellet shrinkage and densification is prevented by flash drying each pellet 42 during and immediately following extrusion thereby removing moisture from the pellet 42 that ordinarily would dissolve or solubilize water-soluble starches, including cold water-soluble starches, including amorphous cold water soluble amylopectin starch binders, in each pellet 42 and shrink each pellet 42 by causing at least a portion of each pellet 42 to collapse. Preventing post-extrusion moisture in each pellet 42 from dissolving and collapsing each pellet 42 during and immediately following extrusion advantageously helps to preserve the amount of water-soluble starches, including cold water-soluble starches, including amorphous cold water soluble amylopectin starch binders, formed in each pellet 42 by extrusion thereby helping to maximize the absorption, adsorption and clumping ability of the extruded quenched pellets 42 during sorbent use.

Drying of each pellet 42 during quenching also is accomplished by reducing the moisture content or relative humidity in the atmosphere within the quenching chamber 45 by introducing quenching air into the quenching chamber 45 having a sufficiently low temperature and moisture content, e.g. relative humidity, at a high enough volumetric flow rate that condensation of moisture on each pellet 42 after extrusion is substantially completely prevented. Preventing post-extrusion moisture condensation on each pellet further advantageously helps to preserve the amount of water-soluble starches, including cold water-soluble starches, preferably amorphous cold water soluble amylopectin starch binders, formed in each pellet 42 by extrusion thereby helping to maximize the absorption, adsorption and clumping ability of the extruded quenched pellets 42 during sorbent use.

As a result, a method of extruding granular sorbent 42 of the present invention using a granular sorbent extrusion system 40 equipped with a pellet quenching apparatus 48 constructed in accordance with the present invention carrying out a method of granular sorbent pellet quenching of the invention has many benefits including producing extruded quenched pellets 42 of granular sorbent 44 of the present invention having greater pellet crush strength, increased pellet hardness, increased liquid absorption, e.g., increased water and/or oil absorption, increased liquid adsorption, e.g., increased water and/or oil adsorption, lower shrinkage and lower density, increased clumping ability, increased clump retention, and/or increased clump hardness and/or clump crush strength after clump drying. Such extruded granular sorbent 44 of the invention formed of pellets 42 extruded and quenched using a granular sorbent extrusion system 40 equipped with a pellet quenching apparatus 48 in accordance with the present invention advantageously produces extruded quenched pellets 42 well suited for use in water sorbent applications, preferably animal, cat or kitty litter. Such extruded granular sorbent 44 of the invention formed of pellets 42 extruded and quenched using a granular sorbent extrusion system 40 equipped with a pellet quenching apparatus 48 in accordance with the present invention advantageously produces extruded quenched pellets 42 possessing both oleophilic and hydrophobic characteristics making it well suited for use in oil or water insoluble/immiscible liquid sorbent applications, preferably oil sorbent, oil absorbent, or oil dry.

Such extruded granular sorbent 44 of the invention formed of pellets 42 extruded and quenched using a granular sorbent extrusion system 40 equipped with a pellet quenching apparatus 48 in accordance with the present invention advantageously produces extruded quenched pellets 42 that are oleophilic, hydrophobic and hydrophilic making the pellets 42 well suited for dual use in both (a) water soluble liquid absorbent applications and (b) oil or water insoluble/immiscible liquid sorbent applications. Such granular sorbent 44 formed of such extruded and quenched pellets 42 of oleophilic, hydrophobic and hydrophilic construction can be used not only as pet or animal litter but also as oil absorbent or oil dry.

A granular absorbent extrusion system 40 and method of the present invention preferably not only quenches each pellet 42 immediately upon extrusion but also flash dries each pellet 42 immediately upon extrusion thereby preventing moisture-related changes to the pellets 42 from occurring right after extrusion. In a preferred system and method, each pellet 42 is fluid quenched, preferably gas quenched, immediately upon extrusion by introducing gas into atmosphere surrounding pellets 42 as they are extruded where the quenching gas has a temperature and moisture content, e.g., humidity, far enough below the temperature and humidity of the surrounding atmosphere to prevent moisture related changes from occurring to the extruded pellet 42. In one system and method, a sufficient volume of quenching gas, preferably air, is introduced into the surrounding atmosphere in which pellets 42 are discharged from the extruder 44 with the quenching air having a low enough temperature and humidity to dehumidify moisture in the surrounding atmosphere from water vaporized out each pellet 42 during extrusion enough to prevent moisture in the surrounding atmosphere from subsequently condensing on the pellets 42. Drying of each pellet 42, preferably flash drying, preferably also occurs during quenching as a result of moisture on the outer pellet surface being evaporated advantageously reducing pellet moisture content.

Such a volume of quenching air introduced into the surrounding atmosphere at such a sufficiently low temperature and humidity to prevent extruded pellets 42 from becoming wetted by moisture condensation advantageously reduces and preferably substantially completely prevents pellet shrinkage that ordinarily occurs immediately after extrusion. Doing so also prevents consumption of water solubles in each pellet 42 that ordinarily dissolve or solubilize from moisture condensation thereby advantageously preserving the amount of water solubles in each pellet 42 after extrusion. This advantageously not only prevents loss of water soluble binder by preventing consumption due to condensation induced wetting and solubilization, it also advantageously helps maximize pellet absorption by preventing liquid absorbent solubles from similarly being consumed by condensation induced wetting and solubilization.

During quenching apparatus operation, air having a moisture content or humidity, e.g., relative humidity, and temperature sufficient far enough below one or both of the pellet extrusion temperature and the temperature of the extruder 46 at the die 60, e.g., extruder temperature, is delivered by the air mover 120 via the duct 126 through outlet 128 into the knife cage 56 at a sufficiently high enough volumetric flow rate to quench a plurality of pairs, i.e., at least three, of pellets 42 substantially simultaneously as the plurality of pairs of pellets 42 are substantially simultaneously being extruded or squeezed out the openings 61 in the extruder die 60. Air having such a moisture content or humidity, e.g., relative humidity, and temperature sufficiently far enough below one or both of the pellet extrusion temperature and extruder temperature is delivered to the knife cage 56 at a sufficiently high enough flow rate to continue quenching the plurality of pairs of pellets 42 after being squeezed out the die 60 including continuing quenching during at least a portion of the time the plurality of pairs of pellets 42 reside in the knife cage 56. Preferably, air having such a moisture content or humidity, e.g., relative humidity, and temperature sufficiently far enough below one or both of the pellet extrusion temperature and extruder temperature is delivered to the knife cage 56 at a sufficiently high enough flow rate to continue quenching the plurality of pairs of pellets 42 even during the entire time the plurality of pairs of pellets 42 reside in the knife cage 56 before being received by the pellet collector 72 of the extruder 46. Air having such a moisture content or humidity, e.g., relative humidity, and temperature sufficiently far enough below one or both of the pellet extrusion temperature and extruder temperature is delivered to the knife cage 56 at a sufficiently high enough flow rate that quenching of the plurality of pairs of pellets 42 can continue while the pellets 42 reside in the pellet collector 72 of the extruder 46 even up to the time the pellets 42 are transported from the collector 72 by delivery duct 98.

Quenching air having a temperature less than at least one of the pellet extrusion temperature, e.g., pellet exit temperature at the head of the die 60, and extruder temperature and having a humidity less than the humidity of the atmosphere within the knife cage 56 is discharged from the outlet 128 of the quenching air delivery duct 126 at a high enough flow rate into the knife cage 56 to perform pellet quenching by causing the temperature of each pellet 42 to drop from a temperature of the pellet 42 as the pellet 42 is being extruded out the die opening 61, e.g., pellet exit temperature at the head of the die 60, to a cooler quenched pellet temperature that is at least 15 degrees Celsius less than the pellet extrusion temperature thereby rapidly cooling each pellet 42 to a quenched pellet temperature that preferably is no higher than 60 degrees Celsius above ambient temperature before each pellet 42 removed from the quenching chamber 45 and enters the delivery duct 98. In a preferred quenching apparatus embodiment and quenching method, air having a temperature less than at least one of the pellet extrusion temperature and extruder temperature and having a humidity less than the humidity of the atmosphere within the knife cage 56 is introduced into the knife cage 56 at a high enough flow rate to perform pellet quenching by causing the temperature of each pellet 42 to drop from its pellets extrusion temperature to a quenched pellet temperature that is at least 20 degrees Celsius less than the pellet extrusion temperature thereby rapidly cooling each pellet 42 to a quenched pellet temperature that preferably is no higher than 55 degrees above ambient temperature before each pellet 42 enters the delivery duct 98. In another preferred embodiment and method, air having a temperature less than at least one of the pellet extrusion temperature and extruder temperature and having a humidity less than the humidity of the atmosphere within the knife cage 56 is introduced into the knife cage 56 at a high enough flow rate to perform pellet quenching by causing the temperature of each pellet 42 to drop from its pellets extrusion temperature to a quenched pellet temperature that is at least 25 degrees Celsius less than the pellet extrusion temperature thereby rapidly cooling each pellet 42 to a quenched pellet temperature that preferably is no higher than 50 degrees above ambient temperature before each pellet 42 enters the delivery duct 98. In still another preferred embodiment and method, air having a temperature less than at least one of the pellet extrusion temperature and extruder temperature and having a humidity less than the humidity of the atmosphere within the knife cage 56 is introduced into the knife cage 56 at a high enough flow rate to perform pellet quenching by causing the temperature of each pellet 42 to drop from its pellets extrusion temperature to a quenched pellet temperature that is at least 30 degrees Celsius less than the pellet extrusion temperature thereby rapidly cooling each pellet 42 to a quenched pellet temperature that preferably is no higher than about 45 degrees above ambient temperature before each pellet 42 enters the delivery duct 98. Ambient temperature is defined as the temperature of the air of the ambient atmosphere disposed outside the knife cage 56 and pellet collector 72 of the extruder 46 (and disposed outside the extruder 46) measured at a distance of at least eight feet away from the knife cage 56 and collector 72.

A pellet quenching apparatus 48, pellet quenching method, and extruded granular sorbent 44 in accordance with the present invention air quenches each pellet 42 upon extrusion rapidly cooling each extruded pellet 42 as described herein, including as described in the preceding paragraph, preserving liquid soluble starches, preferably cold water soluble starches, including cold water soluble binder, formed in each pellet 42 during extrusion preventing loss of water solubility and preventing loss of absorptivity in each pellet 42 that normally occurs upon extrusion if not air quenched such that after quenching the extruded pellets 42 each have at least 10%, preferably at least 12%, water solubles by uncoated pellet weight and which each also have a water absorptivity of at least three times, preferably at least four times, by uncoated pellet weight. Rapid cooling by air quenching "sets" or freezes the state of the water solubles in each extruded pellet 42 such that the air quenched pellets 42 extruded from starch-containing admixture as disclosed herein at extruder operating parameters as also disclosed herein produces granular sorbent 44 of the present invention having at least 10%, preferably at least 12%, water soluble starches in each pellet 42 by uncoated pellet weight thereby containing enough water soluble binder by uncoated pellet weight for pellets 42 wetted with water for sufficient water soluble binder to dissolve, e.g., solubilize, and flow in between adjacent pellets 42 "self-clumping" pellets 42 forming a clump of at least a plurality of pairs of pellets 42 glued together by the binder that becomes substantially hard when the clump is dried.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is dried to a moisture content of no greater than 15% and preferably between 6%-12% moisture by dry or dried clump weight when substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially.

A preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 10% water soluble binder, including cold water soluble binder, by uncoated pellet weight and also has a water absorptivity of at least three times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 10% starch-based water soluble binder in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when substantially dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 10% cold water soluble binder by uncoated pellet weight and also has a water absorptivity of at least three times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 10% cold water soluble binder in each pellet 42 by uncoated pellet weight thereby containing enough cold water soluble binder for pellets 42 wetted with water to solubilize or dissolve sufficient water soluble binder that flows between adjacent pellets 42 in the form of flowable starch-based adhesive clumping pellets 42 together producing a clump formed of a plurality of pairs of pellets 42 glued together by the flowable starch-based adhesive that becomes substantially hard when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Still another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 15% water solubles content, e.g., water soluble starches, by uncoated pellet weight and also has a water absorptivity of at least three times uncoated pellet weight. Rapid cooling by air quenching "sets" or freezes the state of the water solubles in each pellet 42 upon extrusion such that the air quenched pellets 42 extruded from starch-containing admixture as disclosed herein at extruder operating parameters as also disclosed herein produces granular sorbent 44 of the present invention having at least 15% water solubles, including water soluble binder, in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is dried to a moisture content of no greater than 15% and preferably between 6%-12% moisture when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 15% water soluble binder, including cold water soluble binder, by uncoated pellet weight and also has a water absorptivity of at least three times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 15% water soluble binder in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 15% cold water soluble binder by uncoated pellet weight and also has a water absorptivity of at least three times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 15% cold water soluble binder in each pellet 42 by uncoated pellet weight thereby containing enough cold water soluble binder for pellets 42 wetted with water to dissolve sufficient cold water soluble binder that flows between adjacent pellets 42 clumping pellets 42 together producing a clump formed of a plurality of pairs of pellets 42 glued together by the binder that becomes substantially hard when the clump is dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Still yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 20% water solubles content, e.g., water soluble starches, by uncoated pellet weight and also has a water absorptivity of at least four and a half times uncoated pellet weight. Rapid cooling by air quenching "sets" or freezes the state of the water solubles in each pellet 42 upon extrusion such that the air quenched pellets 42 extruded from starch-containing admixture as disclosed herein at extruder operating parameters as also disclosed herein produces granular sorbent 44 of the present invention having at least 20% water solubles, including water soluble binder, in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is dried to a moisture content of no greater than 15% and preferably between 6%-12% moisture by dry or dried clump weight. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 20% starch-based water soluble binder, including starch-based cold water soluble binder, by uncoated pellet weight and also has a water absorptivity of at least four times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 20% starch-based water soluble binder in each pellet 42 by uncoated pellet weight thereby containing enough water soluble binder by uncoated pellet weight for pellets 42 wetted with water to dissolve and flow sufficient water soluble binder in the form of starch-based flowable adhesive between adjacent pellets 42 forming a clump of at least a plurality of pairs of pellets 42 glued together by the starch-based flowable adhesive that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 20% starch-based cold water soluble binder by uncoated pellet weight and also has a water absorptivity of at least three times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 20% starch-based cold water soluble binder in each pellet 42 by uncoated pellet weight thereby containing enough starch-based cold water soluble binder for pellets 42 wetted with water to dissolve sufficient starch-based cold water soluble binder that flows between adjacent pellets 42 clumping pellets 42 together producing a clump formed of a plurality of pairs of pellets 42 glued together by the binder that becomes substantially hard when the clump is dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet still another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 25% water solubles content, e.g., water soluble starches, by uncoated pellet weight and also has a water absorptivity of at least four times uncoated pellet weight. Rapid cooling by air quenching "sets" or freezes the state of the water solubles in each pellet 42 upon extrusion such that the air quenched pellets 42 extruded from starch-containing admixture as disclosed herein at extruder operating parameters as also disclosed herein produces granular sorbent 44 of the present invention having at least 25% water solubles, including water soluble binder, in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 25% water soluble binder, including cold water soluble binder, by uncoated pellet weight and also has a water absorptivity of at least four times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 25% water soluble binder in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 25% cold water soluble binder by uncoated pellet weight and also has a water absorptivity of at least three times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 25% cold water soluble binder in each pellet 42 by uncoated pellet weight thereby containing enough cold water soluble binder for pellets 42 wetted with water to dissolve sufficient cold water soluble binder that flows between adjacent pellets 42 clumping pellets 42 together producing a clump formed of a plurality of pairs of pellets 42 glued together by the binder that becomes substantially hard when the clump is dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 30% water solubles content, e.g., water soluble starches, by uncoated pellet weight and also has a water absorptivity of at least four times uncoated pellet weight. Rapid cooling by air quenching "sets" or freezes the state of the water solubles in each pellet 42 upon extrusion such that the air quenched pellets 42 extruded from starch-containing admixture as disclosed herein at extruder operating parameters as also disclosed herein produces granular sorbent 44 of the present invention having at least 30% water solubles, including water soluble binder, in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 30% water soluble binder, including cold water soluble binder, by uncoated pellet weight and also has a water absorptivity of at least three and a half times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 30% water soluble binder in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry by dry or dried clump weight. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 30% cold water soluble binder by uncoated pellet weight and also has a water absorptivity of at least three times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 30% cold water soluble binder in each pellet 42 by uncoated pellet weight thereby containing enough cold water soluble binder for pellets 42 wetted with water to dissolve sufficient cold water soluble binder that flows between adjacent pellets 42 clumping pellets 42 together producing a clump formed of a plurality of pairs of pellets 42 glued together by the binder that becomes substantially hard when the clump is dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 40% water solubles content, e.g., water soluble starches, by uncoated pellet weight and also has a water absorptivity of at least four and a half times uncoated pellet weight. Rapid cooling by air quenching "sets" or freezes the state of the water solubles in each pellet 42 upon extrusion such that the air quenched pellets 42 extruded from starch-containing admixture as disclosed herein at extruder operating parameters as also disclosed herein produces granular sorbent 44 of the present invention having at least 40% water solubles, including water soluble binder, in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

A further preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 35% water soluble binder, including cold water soluble binder, by uncoated pellet weight and also has a water absorptivity of at least four times uncoated pellet weight. Rapid cooling by air quenching "sets" or freezes the state of the water soluble binder in each pellet 42 upon extrusion such that the air quenched pellets 42 extruded from starch-containing admixture as disclosed herein at extruder operating parameters as also disclosed herein produces granular sorbent 44 of the present invention having at least 35% water soluble binder in each pellet 42 by uncoated pellet weight thereby containing enough water soluble binder by uncoated pellet weight for pellets 42 wetted with water to dissolve and flow sufficient water soluble binder between adjacent pellets 42 forming a clump of at least a plurality of pairs of pellets 42 glued together by the binder that becomes a substantially hard clump when dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

Yet another preferred granular sorbent, method of making granular sorbent, quenching apparatus 48, and pellet quenching method of the present invention results in each pellet 42 being air quenched upon extrusion rapidly cooling each extruded pellet 42 as described herein, including as described hereinabove, preserving water solubles and water absorption such that each air quenched pellet 42 of granular sorbent 44 has at least 35% cold water soluble binder by uncoated pellet weight and also has a water absorptivity of at least three and a half times uncoated pellet weight. Rapid cooling by air quenching "sets" or freezes the state of the cold water soluble binder in each pellet 42 upon extrusion such that the air quenched pellets 42 extruded from starch-containing admixture as disclosed herein at extruder operating parameters as also disclosed herein produces granular sorbent 44 of the present invention having at least 35% cold water soluble binder in each pellet 42 by uncoated pellet weight thereby containing enough cold water soluble binder for pellets 42 wetted with water to dissolve sufficient cold water soluble binder that flows between adjacent pellets 42 clumping pellets 42 together producing a clump formed of a plurality of pairs of pellets 42 glued together by the binder that becomes substantially hard when the clump is dry.

Each clump formed from sorbent pellets 42 extruded from a starch-containing admixture as described above that have been quenched in accordance with the present invention has a clump crush strength of at least 25 pounds per square inch (PSI) and a clump retention or clump retention rate of at least 80% when the clump is substantially dry. In at least one preferred quenching method and embodiment, each clump formed of quenched extruded sorbent pellets 42 of the present invention has a clump crush strength of at least 30 PSI and a clump retention or clump retention rate of at least 97%, preferably at least 99%, when the clump is substantially dry. In one such preferred quenching method and embodiment, each clump formed of such quenched extruded sorbent pellets 42 of the present invention has a clump crush strength of at least 40 PSI and a clump retention or clump retention rate of at least 90%, preferably at least 95%, when the clump is substantially dry. In another preferred quenching method and embodiment, each clump formed of such quenched extruded sorbent pellets 42 of the present invention has a clump crush strength of at least 50 PSI and a clump retention or clump retention rate of at least 95%, preferably at least 97%, when the clump is substantially dry. In a further preferred method and embodiment, each clump formed of such quenched extruded sorbent pellets 42 of the present invention has a clump crush strength of at least 65 PSI and a clump retention or clump retention rate of at least 97%, preferably at least 99%, when the clump is substantially dry.

The present invention is thereby directed to a granular absorbent extrusion system 48 for producing extruded granular sorbent 44 comprising an extruder having a perforate extruder die disposed at a discharge end of the extruder from which sorbent pellets are extruded from a starch-containing admixture during extruder operation. In the granular absorbent extrusion system, the sorbent pellets are extruded by the extruder having sufficient water soluble binder in each sorbent pellet formed from starch in the starch-containing admixture during extrusion for a plurality of pellets wetted with water to form a clump containing at least a plurality of pairs of the pellets having a clump crush strength of at least 25 pounds per square inch and a clump retention rate of at least 80% when the clump is substantially dry. Each sorbent pellet extruded from the starch-containing admixture preferably can and does contain at least 10% water soluble starch in each sorbent pellet. Each sorbent pellet extruded from the starch-containing admixture preferably can and does contain at least 10% cold water soluble starch binder in each sorbent pellet. The sorbent pellets extruded by the extruder from the starch-containing admixture each preferably can and do have at least 15% cold water soluble starch binder forming clumps comprised of a plurality of pairs of wetted sorbent pellets having a clump crush strength of at least 25 pounds per square inch and a clump retention rate of at least 90% when the clump is substantially dry. The sorbent pellets extruded by the extruder from the starch-containing admixture each preferably can and do have at least 15% cold water soluble starch binder forming clumps comprised of a plurality of pairs of wetted sorbent pellets having a clump crush strength of at least 30 pounds per square inch and a clump retention rate of at least 95% when the clump is substantially dry.

The granular absorbent extrusion system 48 can include a pellet quenching apparatus comprised of (i) a quenching chamber receiving the sorbent pellets as they are extruded from the extruder die, (ii) a quenching gas supply, and (ii) a quenching gas delivery conduit introducing quenching gas into the quenching chamber quenching the extruded sorbent pellets by cooling and drying the extruded sorbent pellets. The quenching chamber comprises one of a knife cage enclosing the extruder die and pellet collector in gas-flow communication with the knife cage, the quenching gas delivery conduit has an outlet inline with the extruder die and an opening between the knife cage directing a flow of quenching gas inline therewith onto sorbent pellets as the sorbent pellets are extruded from the extruder die directing the extruded sorbent pellets from the extruder die through the opening between the knife cage into the pellet collector without contacting the knife cage. The extruder 46 has a rotary cutter carried by a cutter shaft having an axis of rotation, the rotary cutter having a plurality of pellet cutting knives engaging an axial outer face of the extruder during extruder operation and wherein the flow of quenching air discharged from the quenching gas delivery conduit outlet is generally perpendicular to the rotational axis of the cutter shaft. The outlet of the quenching gas delivery conduit outlet can be and preferably is generally perpendicular to the rotational axis of the cutter shaft and generally perpendicular to the axial face of the extruder die. The quenching gas delivery conduit outlet, knife cage and pellet collector can be and preferably are arranged generally vertically in-line with one another. The knife cage and pellet collector can be and preferably are substantially gas-tightly or air-tightly sealed. The extruder can and preferably does has an extrudate discharge chamber that receives the sorbent pellets extruded from the extruder and wherein the quenching chamber comprises the extrudate discharge chamber. The extrudate discharge chamber can be of substantially gas-tight or air-tight construction.

The quenching gas delivery conduit can and preferably does have an outlet in gas-flow communication with the quenching chamber forming a plenum that is positively pressurized above ambient pressure by quenching gas introduced into the quenching chamber during pellet quenching. The quenching chamber can and preferably does have a knife cage enclosing the extruder die, the knife cage receiving sorbent pellets as the sorbent pellets are extruded from the extruder die by the extruder during extruder operation, the knife cage substantially gas-tightly or air-tightly sealed. The sorbent pellets extruded into the quenching chamber preferably are quenched by quenching gas in the quenching chamber reducing the temperature of the sorbent pellets from an initial pellet extrusion temperature when the sorbent pellets are extruded from the extruder die to a quenched pellet temperature when the quenched extruded sorbent pellets are removed from the extruder that is at least 25 degrees Celsius less than the initial pellet extrusion temperature.

The sorbent pellets extruded into the quenching chamber preferably are quenched by quenching gas in the quenching chamber reducing the moisture content of the sorbent pellets to a moisture content of no greater than 18% by uncoated pellet weight when the quenched extruded sorbent pellets are removed from the extruder. The sorbent pellets extruded into the quenching chamber are preferably quenched by quenching gas in the quenching chamber reducing the temperature of the sorbent pellets to a temperature no greater than 72 degrees Celsius and reducing the moisture content of the sorbent pellets to a moisture content of no greater than 18% by uncoated pellet weight when the quenched extruded sorbent pellets are removed from the extruder.

The present invention also is directed to granular absorbent extrusion system for producing extruded granular sorbent comprising: (a) an extruder comprising a perforate extruder die disposed at a discharge end of the extruder from which sorbent pellets are extruded during extruder operation; and (b) a pellet quenching apparatus comprised of (i) a quenching chamber receiving the sorbent pellets as they are extruded from the extruder die, (ii) a quenching gas supply, and (ii) a quenching gas delivery conduit introducing quenching gas into the quenching chamber quenching the extruded sorbent pellets by cooling and drying the extruded sorbent pellets. The extruder has an extrudate discharge chamber that receives the sorbent pellets extruded from the extruder and wherein the quenching chamber comprises the extrudate discharge chamber. The extrudate discharge chamber is of substantially gas-tight or air-tight construction. The quenching gas delivery conduit has an outlet in gas-flow communication with the quenching chamber forming a plenum that is positively pressurized above ambient pressure by quenching gas introduced into the quenching chamber during pellet quenching. The quenching chamber comprises a knife cage enclosing the extruder die, the knife cage receiving sorbent pellets as the sorbent pellets are extruded from the extruder die by the extruder during extruder operation, the knife cage substantially gas-tightly or air-tightly sealed.

The quenching chamber can further include a pellet collector in gas-flow communication with the knife cage and wherein the quenching gas delivery conduit outlet, extruder die, knife cage and pellet collector are inline with one another directing a flow of quenching gas inline therewith onto sorbent pellets extruded from the extruder die directing the extruded sorbent pellets from the extruder die through the knife cage and into the pellet collector without contacting the knife cage. The extruder can have a rotary cutter carried by a cutter shaft having an axis of rotation, the rotary cutter having a plurality of pellet cutting knives engaging an axial outer face of the extruder during extruder operation and wherein the flow of quenching air discharged from the quenching gas delivery conduit outlet is generally perpendicular to the rotational axis of the cutter shaft. The outlet of the quenching gas delivery conduit outlet is generally perpendicular to the rotational axis of the cutter shaft and generally perpendicular to the axial face of the extruder die. The quenching gas delivery conduit outlet, knife cage and pellet collector can be and preferably are arranged generally vertically in-line with one another. The knife cage and pellet collector are substantially gas-tightly or air-tightly sealed. The outlet of the quenching gas delivery conduit outlet vertically overlaps the rotary cutter, die and opening between the knife cage and pellet collecting hopper.

The present invention also is directed to method of making granular sorbent comprising: (a) providing an extruder and a starch-containing admixture; and (b) extruding the starch-containing admixture at or above (i) an extruder temperature, and (ii) extruder pressure forming sorbent pellets extruded from the extruder each having at least 15% cold water soluble starches by pellet weight including cold water soluble starch binder sufficient to produce clumps each comprised of a plurality of pairs of the adjacent sorbent pellets when the sorbent pellets forming the clump are wetted with water. Each clump has a clump crush strength of at least 25 pounds per square inch when the clump is substantially dry. Each clump has a clump crush strength of at least 25 pounds per square inch when the clump has a moisture content no greater than 15% by clump weight. Each clump has a clump crush strength of at least 25 pounds per square inch when the clump has a moisture content of between 6% and 12% by clump weight. Each clump has a clump crush strength of at least 25 pounds per square inch and a clump retention rate of at least 95% when the clump is substantially dry.

Each sorbent pellet has at least 10% cold water soluble starch binder by uncoated pellet weight producing clumps each formed of a plurality of pairs of wetted pellets having a clump crush strength of at least 25 pounds per square inch and a clump retention rate of at least 80% when the clump is substantially dry. Each sorbent pellet has at least 15% cold water soluble starch binder by uncoated pellet weight producing clumps each formed of a plurality of pairs of wetted pellets having a clump crush strength of at least 30 pounds per square inch and a clump retention rate of at least 90% when the clump is substantially dry. Each sorbent pellet has at least 15% cold water soluble starch binder by uncoated pellet weight producing clumps each formed of a plurality of pairs of wetted pellets having a clump crush strength of at least 40 pounds per square inch and a clump retention rate of at least 95% when the clump is substantially dry.

The sorbent pellets are extruded from the extruder at a pellet extrusion temperature and comprising the further step of quenching each pellet by reducing pellet temperature to a temperature that is at least 15 degrees Celsius less than the pellet extrusion temperature by the time the sorbent pellet is removed from the extruder. Each pellet removed from the extruder after quenching is completed has a temperature no higher than 83 degrees Celsius.

A quenching chamber is disposed at a discharge end of the extruder in which the sorbent pellets extruded from the extruder are received, the quenching chamber in fluid flow communication with a pellet discharge that removes each pellet from the extruder when pellet quenching is completed. The extruder has: (a) a rotary cutter that cuts sorbent pellets discharged from an extruder die in extruding the sorbent pellets, (b) a knife cage enclosing the rotary cutter and extruder die, the knife cage forming at least part of the quenching chamber, and (c) a quenching air mover that delivers quenching air into the knife cage at a sufficient volumetric flow rate, low enough temperature and low enough humidity to cool each sorbent pellet during quenching by at least 15 degrees Celsius from the pellet extrusion temperature to a temperature no greater than 83 degrees Celsius when quenching is completed. The knife cage is substantially gas-tight and wherein the quenching air received in the knife cage pressurizes at least the knife cage above ambient pressure. Quenching of each sorbent pellet in the quenching chamber retrogrades amylose starch in each pellet. Quenching of each sorbent pellet in the quenching chamber retrogrades amylose starch in each pellet hardening each pellet. Quenching of each sorbent pellet in the quenching chamber prevents moisture vaporizing in each pellet from solubilizing or dissolving water soluble starches in each pellet. Quenching of each sorbent pellet in the quenching chamber prevents moisture vaporizing in each pellet from solubilizing or dissolving cold water soluble starches in each pellet. Quenching of each sorbent pellet in the quenching chamber prevents moisture vaporizing in each pellet from solubilizing or dissolving cold water soluble starch binder in each pellet. Quenching of each sorbent pellet in the quenching chamber prevents moisture vaporizing in each pellet from solubilizing or dissolving cold water soluble amylopectin starch binder in each pellet. Quenching of each sorbent pellet in the quenching chamber prevents moisture vaporizing in each pellet from changing the state of amorphous water soluble starches in each pellet. Quenching of each sorbent pellet in the quenching chamber prevents moisture vaporizing in each pellet from changing the state of amorphous water soluble amylopectin starch binder in each pellet. Quenching of each sorbent pellet in the quenching chamber prevents moisture vaporizing in each pellet from changing the state of amorphous cold water soluble amylopectin starch binder in each pellet.

The present invention also is directed to a method of quenching granular sorbent comprising: (a) providing an extruder and a starch-containing admixture; (b) extruding the starch-containing admixture at or above (i) an extruder temperature, and (ii) extruder pressure forming sorbent pellets extruded from the extruder at a pellet extrusion temperature having at least 10% water soluble starches by pellet weight; and (c) quenching the pellets by reducing pellet temperature to a temperature that is at least 15 degrees Celsius less than the pellet extrusion temperature. In step (c) quenching of the pellets is performed for a pellet quenching completion time until pellet quenching is substantially completed when the pellets are removed from the extruder. The extruder preferably further includes a pellet collector that receives the pellets extruded by the extruder and wherein pellet quenching completion time is completed when the pellets are removed from the pellet collector.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A method of making extruded granular sorbent comprising the following steps:
   (a) providing an extruder, a starch-containing admixture for being extruded by the extruder into sorbent pellets, a pellet quenching apparatus comprised of a quenching gas supply that supplies quenching gas delivered to quench the sorbent pellets extruded from the extruder;
   (b) extruding the starch-containing admixture from the extruder at or above (i) an extruder temperature, and (ii) an extruder pressure without adding any water or steam during extrusion forming sorbent pellets; and
   (c) quenching each sorbent pellet immediately upon extrusion from the extruder in a quenching gas that cools each sorbent pellet producing quenched sorbent pellets that form clumps of at least a plurality of pairs of the quenched sorbent pellets when wetted with water that each have a clump crush strength of at least 65 pounds per square inch and a clump retention rate of between 80% and 99%.

2. The method of making extruded granular absorbent of claim 1, wherein the sorbent pellets comprise animal litter and each clump comprised of at least a plurality of pairs of the sorbent pellets formed when wetted with water has a clump crush strength of at least 65 pounds per square inch and a clump retention rate of at least 95%.

3. The method of making extruded granular absorbent of claim 1, wherein the sorbent pellets are each comprised of at least one cold water soluble starch formed from starch in the admixture during extrusion from the extruder in step (b) that is substantially preserved in the sorbent pellets by quenching the sorbent pellets in step (c).

4. The method of making extruded granular absorbent of claim 1, wherein the sorbent pellets each have at least a plurality of pores formed therein when extruded from the extruder during step (b) that are substantially retained in the sorbent pellets by quenching in step (c).

5. The method of making extruded granular absorbent of claim 1, wherein the sorbent pellets are able to absorb at least five times uncoated pellet weight in water.

6. The method of making extruded granular absorbent of claim 1, wherein the sorbent pellets are oil sorbent.

7. The method of making extruded granular absorbent of claim 1, wherein during step (c), the sorbent pellets are cooled at least 15 degrees Celsius from an initial pellet extrusion temperature of the sorbent pellets immediately upon extrusion from the extruder during step (b).

8. The method of making extruded granular absorbent of claim 7, wherein the sorbent pellets are dried after extrusion in step (b) by quenching in step (c) to a moisture content of no greater than 13% moisture by uncoated pellet weight.

9. The method of making extruded granular absorbent of claim 8, wherein each clump has a crush strength of at least 65 pounds per square inch and a clump retention rate of at least 95% when the clump is substantially dry.

10. The method of making extruded granular absorbent of claim 1, wherein vaporized moisture escaping from the sorbent pellets upon extrusion from the extruder in step (b) is transported therefrom by the quenching gas during step (c) preventing the vaporized moisture from condensing on the sorbent pellets.

11. The method of making extruded granular absorbent of claim 10, wherein each one of the sorbent pellets has a size after quenching in step (c) that is substantially the same as a size of the sorbent pellets when extruded from the extruder in step (b).

12. The method of making extruded granular absorbent of claim 11, wherein during the pellet quenching step (c), the sorbent pellets are cooled at least 15 degrees Celsius from an initial pellet extrusion temperature of the sorbent pellets immediately upon extrusion from the extruder during step (b).

13. The method of making extruded granular absorbent of claim 10, wherein each clump formed has a crush strength of at least 65 pounds per square inch and a clump retention rate of at least 95% when the clump has a moisture content of no greater than 15% by clump weight.

14. The method of making extruded granular absorbent of claim 1, wherein the pellet quenching apparatus comprises an air mover that delivers quenching gas comprised of turbulently flowing air into a quenching chamber into which the sorbent pellets enter upon extrusion from the extruder during step (b) and are quenched by the turbulently flowing air in step (c).

15. The method of making extruded granular absorbent of claim 14, wherein the sorbent pellets extruded from the extruder during step (b) into the quenching chamber during step (c) where turbulently flowing air in the quenching chamber cools the sorbent pellets at least 15 degrees Celsius below an initial pellet extrusion temperature of the sorbent pellets immediately upon extrusion from the extruder in step (b).

16. The method of making extruded granular absorbent of claim 15, wherein during step (c), the sorbent pellets are dried in the quenching chamber by the turbulently flowing air to a moisture content of no greater than 13% moisture by uncoated pellet weight before exiting the quenching chamber.

17. The method of making extruded granular absorbent of claim 16, wherein each clump formed by wetting with water at least a plurality of pairs of the sorbent pellets quenched in step (c) has a crush strength of at least 65 pounds per square inch and a clump retention rate of at least 95% when the clump is substantially dry having a moisture content of no greater than 15% by clump weight.

18. The method of making extruded granular absorbent of claim 1, wherein the pellet quenching apparatus comprises an air mover that delivers quenching gas comprised of air into a substantially gas-tightly sealed quenching chamber at a discharge end of the extruder into which the sorbent pellets enter upon extrusion from the extruder during step (b) and which are quenched by the air in step (c) before being discharged from the quenching chamber into a pneumatic conveyor.

19. The method of making extruded granular absorbent of claim 18, wherein the air mover comprises a centrifugal fan or squirrel cage blower that delivers quenching air into the quenching chamber at a volumetric flow rate of at least 500 cubic feet per minute causing quenching air to turbulently flow in the quenching chamber during step (c).

20. The method of making extruded granular absorbent of claim 19, wherein each one of the sorbent pellets has a size after quenching in step (c) that is substantially the same as a size of the sorbent pellets when extruded from the extruder in step (b).

21. The method of making extruded granular absorbent of claim 18, wherein the sorbent pellets each have at least a plurality of pores formed therein when extruded from the extruder during step (b) that are retained in the sorbent pellets by quenching in step (c).

22. The method of making extruded granular absorbent of claim 18, wherein the sorbent pellets are each comprised of a cold water soluble starch formed during extrusion in step (b) that is preserved in the sorbent pellets by quenching the sorbent pellets in step (c).

23. A method of making extruded granular sorbent comprising the following steps:
(a) providing an extruder, a starch-containing admixture for being extruded by the extruder into sorbent pellets from a discharge end of the extruder, and a pellet quenching apparatus comprised of an air mover that delivers quenching air to a substantially air-tight quenching chamber disposed at the discharge end of the extruder into which the sorbent pellets extruded from the extruder are received;
(b) extruding sorbent pellets from the starch-containing admixture in the extruder without adding any water or steam during extrusion, the sorbent pellets having an initial pellet extrusion temperature upon extrusion from the extruder; and
(c) quenching each sorbent pellet extruded from the extruder into the quenching chamber by the air mover delivering quenching air into the quenching chamber (i) cooling the sorbent pellets to a temperature at least 15 degrees Celsius cooler than the initial pellet extrusion temperature, and (ii) reducing the moisture of the sorbent pellets to no greater than 13% moisture by uncoated pellet weight.

24. The method of making extruded granular absorbent of claim 23, wherein each one of the sorbent pellets has a size after quenching in step (c) that is substantially the same as a size of the sorbent pellets when extruded from the extruder in step (b).

25. The method of making extruded granular absorbent of claim 24, wherein vaporized moisture escaping from the sorbent pellets upon extrusion from the extruder in step (b) is transported therefrom by the quenching gas during step (c) preventing the vaporized moisture from condensing on the sorbent pellets.

26. The method of making extruded granular absorbent of claim 23, wherein vaporized moisture escaping from the sorbent pellets upon extrusion from the extruder in step (b) is transported therefrom by the quenching gas during step (c) preventing the vaporized moisture from condensing on the sorbent pellets.

27. The method of making extruded granular absorbent of claim 23, wherein the sorbent pellets comprise animal litter that form clumps comprised of at least a plurality of pairs of the sorbent pellets when wetted with water having a clump crush strength of at least 65 pounds per square inch and a clump retention rate of at least 95%.

28. The method of making extruded granular absorbent of claim 23, wherein the sorbent pellets are able to absorb at least five times uncoated pellet weight in water.

29. The method of making extruded granular absorbent of claim 23, wherein the sorbent pellets comprise oil absorbent.

30. The method of making extruded granular absorbent of claim 23, wherein the air mover delivers quenching air into the quenching chamber at a volumetric flow rate of at least 500 cubic feet per minute causing quenching air in the quenching chamber to turbulently flow during step (c).

31. The method of making extruded granular absorbent of claim 30, wherein the air mover comprises a centrifugal fan or a squirrel cage blower.

32. The method of making extruded granular absorbent of claim 30, wherein each one of the sorbent pellets has a size after quenching in step (c) that is substantially the same as a size of the sorbent pellets when extruded from the extruder in step (b).

33. The method of making extruded granular absorbent of claim 30, wherein vaporized moisture escaping from the sorbent pellets upon extrusion from the extruder in step (b) is transported therefrom by the quenching gas during step (c) preventing the vaporized moisture from condensing on the sorbent pellets.

34. The method of making extruded granular absorbent of claim 30, wherein the quenching air delivered to the quenching chamber by the air mover during step (c) flows through the quenching chamber and into a pneumatic conveyor with the quenching air flow transporting the sorbent pellets after step (c) into the pneumatic conveyor.

* * * * *